(12) United States Patent
Long et al.

(10) Patent No.: US 7,896,769 B2
(45) Date of Patent: Mar. 1, 2011

(54) MANUAL VALVE CONTROL FOR MULTI-SPEED PLANETARY TRANSMISSION

(75) Inventors: Charles F. Long, Pittsboro, IN (US); Charles T. Taylor, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 286 days.

(21) Appl. No.: 12/170,566

(22) Filed: Jul. 10, 2008

(65) Prior Publication Data
US 2009/0258746 A1 Oct. 15, 2009

Related U.S. Application Data

(60) Provisional application No. 61/045,141, filed on Apr. 15, 2008.

(51) Int. Cl.
*F16H 31/00* (2006.01)
(52) U.S. Cl. ..................................... 475/123
(58) Field of Classification Search ........................ None
See application file for complete search history.

(56) References Cited

U.S. PATENT DOCUMENTS

| | | | |
|---|---|---|---|
| 5,601,506 A | 2/1997 | Long et al. | |
| 6,382,248 B1 | 5/2002 | Long et al. | |
| 6,520,881 B1 * | 2/2003 | Long et al. | 475/119 |
| 6,585,617 B1 * | 7/2003 | Moorman et al. | 475/119 |
| 6,752,738 B1 | 6/2004 | Martin et al. | |
| 6,767,304 B1 | 7/2004 | Botosan et al. | |
| 7,059,995 B2 | 6/2006 | Stevenson | |
| 7,140,993 B2 | 11/2006 | Long et al. | |
| 7,285,066 B2 * | 10/2007 | Long et al. | 475/121 |
| 7,288,039 B2 * | 10/2007 | Foster et al. | 475/5 |
| 7,395,837 B2 * | 7/2008 | Foster et al. | 137/557 |
| 7,651,427 B2 * | 1/2010 | Long et al. | 475/120 |
| 2003/0114261 A1 | 6/2003 | Moorman et al. | |
| 2007/0117671 A1 | 5/2007 | Long et al. | |
| 2008/0064556 A1 | 3/2008 | Kamm et al. | |
| 2008/0108474 A1 | 5/2008 | Seo | |
| 2010/0105522 A1 * | 4/2010 | Hagelskamp | 477/138 |

* cited by examiner

*Primary Examiner*—Dirk Wright
(74) *Attorney, Agent, or Firm*—Barnes & Thornburg LLP

(57) ABSTRACT

A manual valve control for a multi-speed vehicle transmission is provided. Electronic and hydraulic components are provided, including trim valve systems that are multiplexed by a shift valve and a manual valve. The trim valves and shift valve are self-diagnosing via a plurality of multiplexed pressure switches. The control enables single and double range shifts among the multiple forward speed ratios, including shifts to and from sixth and higher forward ratios, reverse and neutral. The control also includes a reduced engine load at stop feature. In addition, a power off/limp home feature provides a plurality of failure modes, including a failure mode for sixth and higher forward speed ratios.

18 Claims, 18 Drawing Sheets

MANUAL VALVE CONTROL FOR MULTI-SPEED PLANETARY TRANSMISSION

RELATED APPLICATION

This application claims the benefit of U.S. Provisional Patent Application Ser. No. 61/045,141, filed Apr. 15, 2008, which is incorporated herein by this reference in its entirety.

TECHNICAL FIELD

The present invention relates generally to automatic transmissions for automotive vehicles, and more particularly, to an electro-hydraulic control for a multi-speed planetary transmission.

BACKGROUND

Many types of multi-speed transmissions are available for motor vehicles. One such type is a six-speed planetary transmission having clutch-to-clutch shifting controls, as disclosed by Polak in U.S. Pat. No. 4,070,927. A higher number of forward speed ratios may be desirable to increase the operating range of the vehicle engine, improve shift quality, improve fuel economy, or for other reasons. For example, seven- and eight-speed automatic transmissions have now been developed. A number of potential challenges to commercial availability of higher-order transmissions exist; however, including increased size, complexity and cost of such transmissions.

The clutches or other shift mechanisms of automatic transmissions are typically controlled by electro-hydraulic systems in which electronic controls selectively actuate hydraulic valves, which control the distribution of pressurized fluid to engage and disengage the shift mechanisms upon command. Examples of prior electro-hydraulic control systems are disclosed in U.S. Pat. Nos. 4,827,806; 5,601,506; 5,616,093; 6,520,881; and 7,140,993, all of which are issued to Long et al.

SUMMARY

According to one aspect of the present invention, a manual valve control for a vehicle transmission having more than six forward speeds is provided. The manual valve control includes a plurality of electro-hydraulic trim valve systems configured to receive electrical signals and selectively communicate pressurized fluid to a number of transmission shift mechanisms, wherein the number of transmission shift mechanisms is greater than the number of electro-hydraulic trim valve systems, a shift valve in selective fluid communication with at least one of the trim valve systems and with at least one of the transmission shift mechanisms, and a manual valve having a plurality of manually selectable positions.

The control may include first, second, third and fourth trim valves and a plurality of passages configured to selectively fluidly couple the first, second, third, and fourth trim valves, the shift valve, and the manual valve to first, second, third, fourth and fifth transmission shift mechanisms. The first and second trim valves, the shift valve and the manual valve may control the first, second and third transmission shift mechanisms, and the third and fourth trim valves may control the fourth and fifth transmission shift mechanisms.

The control may include an electronic control and first, second, third, fourth, and fifth actuators actuatable by the electronic control, wherein the first, second, third and fourth actuators selectively provide output pressure to the first, second, third and fourth trim valves, respectively, and the fifth actuator selectively provides output pressure to the shift valve. The first and second actuators may be normally high solenoids. The fifth actuator may be a normally low, on/off solenoid. The sixth actuator may be actuatable to provide output pressure to a torque converter flow valve to selectively control application of a torque converter clutch.

The control may include a reduced engine load at stop subsystem operably coupled to the torque converter flow valve. The reduced engine load at stop subsystem may selectively disengage a torque converter pump clutch from a drive unit of the vehicle.

The control may include a boost valve in fluid communication with at least one trim valve system and the shift valve.

According to another aspect of the present invention, a manual valve control for an automatic transmission of a vehicle is provided. The control includes at least one trim valve system configured to selectively distribute fluid pressure to at least one transmission shift mechanism, a shift valve operable to selectively distribute fluid pressure to a first transmission shift mechanism, a manual valve operable to selectively distribute fluid pressure to second and third transmission shift mechanisms, an actuator configured to selectively receive electrical signals from a controller and selectively cause fluid pressure to be applied to the shift valve, and a plurality of passages selectively fluidly coupling the manual valve and the shift valve, at least one of the passages being configured to selectively communicate main pressure between the shift valve and the manual valve.

In connection with a transmission including reverse, neutral, and first through eighth forward ranges, the passages may be configured such that in the event of a power failure, the neutral range maintains the neutral range, the reverse range maintains the reverse range, the first, second, third and fourth forward ranges fail to the third forward range, and the fifth, sixth, seventh and eighth forward ranges fail to the sixth forward range.

The control may include a valve-to-valve passage selectively fluidly coupling the shift valve to a trim valve system and a check valve disposed in the valve-to-valve passage to selectively communicate fluid pressure to the shift valve.

Where the transmission includes a reverse range, a neutral range, and a plurality of forward ranges, the control may include at least two trim valve systems, and the passages selectively fluidly coupling the shift valve and the manual valve to each other may be configured such that when the vehicle is in the neutral range, only one trim valve system is activated.

In connection with a transmission including a reverse range, a neutral range, and first through eighth forward ranges, the passages selectively fluidly coupling the shift valve and the manual valve to each other may be configured such that the shift valve distributes fluid pressure to the first transmission shift mechanism when the vehicle is in the first, second, or third forward range, the manual valve distributes fluid pressure to the second transmission shift mechanism when the vehicle is in the fourth, fifth, or sixth forward range, and the manual valve distributes fluid pressure to the third transmission shift mechanism when the vehicle is in the sixth, seventh or eighth forward range.

According to another aspect of the present invention, a manual valve control for an automatic transmission of a vehicle is provided. The control includes a plurality of trim valves, a shift valve in selective fluid communication with at least one of the trim valves and with a plurality of transmission shift mechanisms, and a plurality of pressure switches operably coupled to the trim valves and the shift valve to detect the position of each of the trim valves and the shift valve, wherein the number of pressure switches is less than the sum of the number of trim valves plus the shift valve.

The control may include first, second, third and fourth trim valves, and first, second, third and fourth pressure switches in fluid communication with the first, second, third and fourth trim valves, respectively, and at least one of the pressure switches may detect the position of a trim valve and also be configured to detect the position of the shift valve. The pressure switches may be operable to detect changes in the positions of the trim valves and the shift valve corresponding to single range shifts, double range shifts, and reverse directions. A valve to valve passage selectively fluidly coupling two of the pressure switches to a pressurized fluid passage. The control may include a manual valve having a plurality of manually selectable positions, and two of the pressure switches may be configured to detect a position of the manual valve.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

In general, like structural elements on different figures refer to identical or functionally similar structural elements, although reference numbers may be omitted from certain views of the drawings for ease of illustration.

DETAILED DESCRIPTION

Aspects of the present invention are described with reference to certain illustrative embodiments shown in the accompanying drawings and described herein. While the present invention is described with reference to the illustrative embodiments, it should be understood that the present invention as claimed is not limited to the disclosed embodiments.

Figure 1:
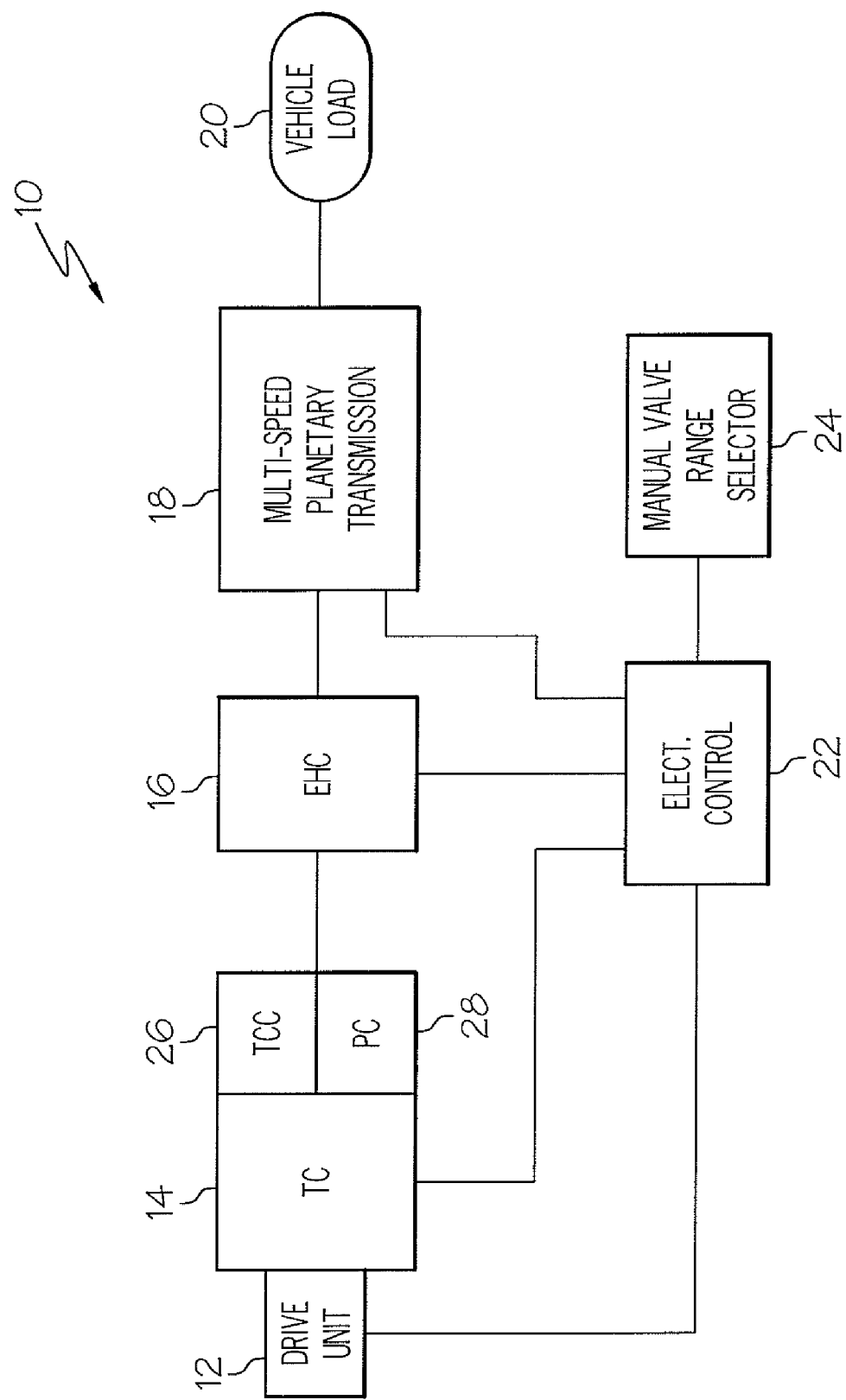
FIG. 1 is a simplified block diagram of a motor vehicle powertrain including an electro-hydraulic control system for a multi-speed transmission of a motor vehicle in accordance with the present invention.

FIG. 1 depicts a simplified logical block diagram of an electro-hydraulic transmission control 16 in the context of an exemplary vehicle powertrain 10. Control 16 comprises an electro-hydraulic apparatus that is capable of providing full control of an eight speed planetary transmission. Control 16 controls single range shifts, double range (or "skip") shifts, "garage" shifts, application and release of a torque converter clutch, and provides a reduced engine load at stop (RELS) feature, and also provides power failure/limp-home protection in multiple ranges, as described herein. Garage shifts are shifts from neutral to a forward ratio, from neutral to reverse, or between forward and reverse. Limp-home refers to the capability of the transmission control to automatically cause the transmission to assume a predefined operating range in the event of a transmission power failure, so that the vehicle can be safely operated or taken out of operation once the failure is detected.

Control 16 includes a shift valve and a plurality of trim valve systems, such that the number of trim systems required to operate the transmission 18 is less than the number of clutches or other shift mechanisms provided by the transmission, while still providing all of the features mentioned above. Trim systems can be costly; therefore, a reduction in the number of required trim systems may be considered advantageous, particularly as the number of shift mechanisms in the transmission increases.

In FIG. 1, the lines shown as connecting blocks 12, 14, 16, 18, 20, 22, 24, 26, 28 of powertrain 10 represent logical connections which, in practice, may include one or more electrical, mechanical and/or fluid connections, passages, couplings or linkages, as will be understood by those skilled in the art and as described herein.

Powertrain 10 includes drive unit 12, torque transferring apparatus 14, electro-hydraulic transmission control 16, multi-speed transmission 18 and final drive 20. Drive unit 12 generally provides a torque output to torque transferring apparatus 14. Drive unit 12 may be an internal combustion engine of a compression-ignition type (i.e. diesel) or a spark-ignition type (i.e. gasoline), or the like. Torque transferring apparatus 14 selectively establishes a coupling between drive unit 12 and transmission 18 to convert and/or transfer the torque output from drive unit 12 to the vehicle transmission 18. As such, torque transferring apparatus 14 normally includes a fluid coupling such as a torque converter.

Transmission 18 includes an input shaft, an output shaft, an assembly of gears, and a plurality of gear-shifting mechanisms that are selectively engaged and disengaged by electro-hydraulic transmission control 16 to cause the vehicle to assume one of a plurality of operational modes or ranges including at least eight forward speed ratios, neutral, and reverse. As such, the shift mechanisms of transmission 18 are in fluid communication with hydraulic control elements of control 16.

The embodiment of control 16 shown in FIGS. 2-17 relates to an eight-speed transmission that includes four planetary gearsets and five shift mechanisms (C1, C2, C3, C4, C5), which are configured so that two shift mechanisms are applied in any range (except neutral). A chart showing an example of numerical values for gear ratios and ratio steps corresponding to the various gear states of an eight speed transmission having four planetary gearsets and five shifting mechanisms is provided in Long et al., U.S. Provisional Patent Application Ser. No. 61/045,141, filed Apr. 15, 2008, which is incorporated herein by this reference. Those of ordinary skill in the art will understand that such transmission is offered only as an example, and that aspects of the present invention are applicable to other multi-speed transmissions.

In this disclosure, the term "shift mechanism" may be used to refer to one or more clutches, brakes, or other friction elements or devices, or similar suitable mechanisms configured to cause the transmission to switch from one range or gear ratio to another, different range or gear ratio.

Transmission 18 drives the vehicle load 20. Vehicle load 20 generally includes the drive wheels and driven load mass. The actual weight of vehicle load 20 may be quite considerable and/or vary considerably over the course of the vehicle's use, as may be the case with commercial vehicles such as trucks, buses, emergency vehicles, and the like.

Torque transferring apparatus 14 may include one or more selectively engageable and disengageable couplers such as a torque converter clutch 26 and/or a pump clutch 28, which may be configured to alter the coupling between drive unit 12 and transmission 18. Torque converter clutches (also known as "lockup" clutches) are often provided to effect unitary rotation of the torque converter pump and turbine in response to reduced hydraulic pressure within the torque converter, which may occur when "slip" (i.e., a difference in rotational speed) between the torque converter pump and turbine is not required. A pump clutch may be selectively disengaged to effect a decoupling of the torque converter pump from the drive unit to reduce the engine load; i.e., when the vehicle is idling, decelerating, or operating at lower speed ratios, for example. Reducing engine load in this manner may improve fuel efficiency of the vehicle and/or provide other advantages.

Couplers 26, 28 of torque transferring apparatus 14 and shift mechanisms C1, C2, C3, C4, C5 are each configured to selectively achieve a mechanical, fluid or friction coupling between components of the powertrain 10 in response to various conditions or changes in conditions. For instance, one or more of couplers 26, 28 and shift mechanisms C1, C2, C3, C4, C5 may be torque transmitting devices or friction devices. One or more of couplers 26, 28 and shift mechanisms C1, C2, C3, C4, C5 may be fluid-operated devices such as clutch- or brake-type devices. As such, one or more of couplers 26, 28 and shift mechanisms C1, C2, C3, C4, C5 may be stationary- or rotating-type devices.

In general, each of couplers 26, 28 and shift mechanisms C1, C2, C3, C4, C5 can be operated independently of each other. For instance, any combination of couplers 26, 28 and shift mechanisms C1, C2, C3, C4, C5 may be engaged and disengaged at a given time. Such devices 26, 28, C1, C2, C3, C4, and C5 may be referred to individually or collectively herein as "torque transmitting mechanisms."

Electrical control 22 controls operation of transmission 18 based on inputs from one or more components of drive unit 12, torque converter 14, transmission 18, range selector 24; and/or other inputs. Such inputs may include electrical and/or analog signals received from sensors, controls or other like devices associated with the vehicle components. For instance, inputs may include signals indicative of transmission input speed, driver requested torque, engine output torque, engine speed, temperature of the hydraulic fluid, transmission output speed, turbine speed, brake position, gear ratio, torque converter slip, and/or other measurable parameters.

Electrical control 22 generally includes electrical circuitry configured to process, analyze or evaluate one or more inputs and issue electrical control signals to electro-hydraulic control system 16, as needed, through one or more electrical lines, conductors, or other suitable connections. Such connections may include hard-wired and/or networked components in any suitable configuration including, for example, insulated wiring and/or wireless transmission as may be appropriate or desired.

Electrical circuitry of control 22 includes computer circuitry such as one or more microprocessors, integrated circuits and related elements configured to process executable instructions expressed in computer programming code or logic, which is stored in one or more tangible media, i.e., any suitable form of memory or storage media that is accessible or readable by the processor or processors. Control 22 may also include analog to digital converters and/or other signal processing circuitry or devices as needed to process one or more of the inputs received from the vehicle components.

While shown schematically in FIG. 1 as a single block 22, it will be understood by those skilled in the art that portions of control 22 may be implemented as separate logical or physical structures. For example, electronic controls for transmission 18 may be physically and/or logically separated from electronic controls for drive unit 12.

Manual range selector 24 interfaces with an operator of the vehicle and converts the operator's manually-driven requests into signals or commands indicative of a selected or desired operational mode of the vehicle, i.e., park, drive, reverse, or neutral. In the illustrated embodiment, range selector 24 is a "manual valve" range selecting mechanism, rather than a fly-by-wire control. Manual valve selectors require at least some range shift selections to be mechanically actuated, for example, park-to-neutral, neutral-to-reverse, and neutral-to-drive. The structure and operation of an exemplary manual valve MV1 is shown in FIGS. 2-17 and described below.

As shown in FIGS. 2-17, control 16 comprises manual valve MV1, a shift valve SV1, and a plurality of trim systems PCS2, PCS5, PCS3, PCS4, wherein the number of trim systems is less than the number of shift mechanisms being controlled thereby. Additionally, control 16 comprises a source of pressurized hydraulic fluid 72, 74, a main or line regulator valve 76, a control or actuator feed regulator valve 70, a torque converter flow regulator valve 78, a RELS valve 68, a plurality of pressure regulator or trim valves 60, 62, 64, 66 (each trim valve being part of a trim system), a boost valve 80, a plurality of EBF valves 82, 84, a plurality of check valves 88, 90, 92, 94, a lube regulator valve 86, a plurality of hydraulic accumulators 50, 52, 54, 56, a plurality of orifices or restrictors 116, 118, 120, 122, 124, 126, 128, 130, 132, 134, 136, 138, 140, 142, 144, 146, 148, 150, 152, 154, 156, 158, 160, 161, 162, a plurality of pressure switches PS2, PS3, PS4, PS5, a plurality of electrical actuators 30, 32, 34, 36, 38, 40, 42, and 46, and a plurality of interconnecting fluid passages including a main passage 100, a control passage 102, a converter feed passage 104, a pump return passage 106, a plurality of valve feed passages 114, 170, 172, 174, 176, 178, 180, 182, a plurality of valve-to-shift mechanism passages 190, 192, 194, 196, 198, 200, and a plurality of valve-to-valve or intermediate or inter-valve passages including passages 210, 212, 214, 216, 218, 220, 222, 224, 226, 228, 230, 232, 234, 236, 342, 344, 346. FIG. 18 provides a legend indicating the various fluid pressures depicted in FIGS. 2-17.

In general, each of main regulator valve 76, actuator feed regulator valve 70, torque converter flow regulator valve 78, RELS valve 68, trim valves 60, 62, 64, 66, shift valve SV1, boost valve 80, and lube regulator valve 86 includes a valve head, a valve spool, at least one valve land interposed between portions of the valve spool or between the valve head and a portion of the valve spool, and a return spring disposed in a spring chamber. Each valve spool is axially translatable in a valve bore in response to changes in fluid pressure or fluid flow through the various passages of control 16. For ease of illustration, the valve bores have been omitted from the figures.

The valve lands each define a diameter that is greater than the diameter defined by the valve spool, such that surfaces of the lands may slidably engage interior surfaces of the valve bore when the valve spool translates within the valve bore. Spool portions between valve lands may selectively connect fluid passages to other fluid passages, or connect fluid passages to fluid chambers, depending on the position of the valve.

Each return spring biases its respective valve in a first or spring set position. Changes in fluid pressure or fluid flow in selected fluid passages may cause the valve spool to translate within the valve bore, causing the return spring to partially or fully compress. Shift valve SV1 is slidable between the first or spring set position and a second or stroked or pressure set position, where the second or stroked or pressure set position is one in which the return spring is fully compressed. Others of the valves, such as trim valves 60, 62, 64, 66, are configured to assume intermediate positions between the first and second positions, in which the return spring is partially compressed, in addition to the first and second positions.

Manual valve MV1 has a plurality of selectable, discrete positions. In the illustrated embodiment, manual valve MV1 has at least three manually selectable positions: reverse, neutral, and drive.

In general, the restrictors or orifices 116, 118, 120, 122, 124, 126, 128, 130, 132, 134, 136, 138, 140, 142, 144, 146, 148, 150, 152, 154, 156, 158, 160, 161, 162 are positioned in various fluid passages to alter or moderate the rate of fluid flow through the passages or a portion thereof, in order to control the rate at which pressure in a fluid passage changes. Such restrictors are used to provide additional control over fluid pressure in the passages, or for other reasons.

Actuators 30, 32, 34, 36, 38, 40, 42, and 46 are operably coupled to control 22 to receive electrical signals (i.e. current) therefrom and selectively actuate valves 60, 62, 64, 66, 68, 70, 76, 78, SV1, to attain, maintain, or transition between the various operational modes of transmission 18. In general, each of actuators 30, 32, 34, 36, 38, 40, 42, 46 may be a solenoid valve of either the on/off or variable bleed type. In the illustrated embodiment, actuator 42 is an on/off solenoid, while actuators 30, 32, 34, 36, 38, 40, and 46 are of the variable bleed type.

Additionally, each of actuators 30, 32, 34, 36, 38, 40, 42, 46 is either of the normally low type or of the normally high type. A normally low (or normally off) solenoid valve provides maximum output pressure when it receives electrical input and provides zero or minimum output pressure when no electrical input is received; while a normally high (or normally on) solenoid valve provides maximum output pressure when it is not receiving any electrical input and provides zero or minimum output pressure when electrical input is provided. Thus, as used herein, when referring to an actuator or solenoid valve as being "actuated," this means either that electrical input is supplied to the solenoid (as in the case of normally low solenoids) or that electrical input is not supplied to the solenoid (as in the case of normally high solenoids). In the illustrated embodiment, actuators 30, 32, and 46 are normally high solenoids while actuators 34, 36, 38, 40, 42, are normally low solenoids.

In general, pressure switches PS2, PS3, PS4, PS5, are each configured to issue an electrical output signal to control 22 when a predetermined fluid pressure is detected by the switch, for diagnostic purposes or for other reasons. Such electrical signals inform control 22 of changes in status of components of control 16. In the illustrated embodiment, the number of pressure switches in control 16 is less than the number of forward ratios provided by transmission 18. Also, the number of pressure switches is less than the sum of the number of trim systems plus the shift valve SV1. The number of pressure switches is also less than the number of shift mechanisms (i.e., C1, C2, C3, C4, C5) in transmission 18.

In the illustrated embodiment, pressure switches PS2, PS5, PS3, PS4 are in fluid communication with trim valves 60, 62, 64, 66, respectively. Pressure switches PS2, PS5, PS3, PS4 thereby detect changes in fluid pressure that are indicative of changes in position of trim valves 60, 62, 64, 66, respectively. Pressure switches PS2, PS5, PS3, PS4 are activated when the corresponding trim valve 60, 62, 64, 66 is actuated by control pressure, as shown in the figures.

Pressure switches PS2, PS3, PS4, PS5, which correspond to the trim systems PCS2, PCS3, PCS4, PCS5 are activated by the trim pressure, as shown in Table 2 and Table 3, or by the control or main pressure, as shown in Table 1. An example of a pressure switch that is activated whenever its associated valve is in either a "trim" state or an "on" state is disclosed in Long et al., U.S. Pat. No. 6,382,248.

Actuators 30, 32, 34, 36, 38, 40, 42, 46, and pressure switches PS2, PS3, PS4, PS5, are in electrical or electronic communication with control 22 by suitable electrical wiring, electric networks, and/or wireless channels, as will be understood by those skilled in the art. However, for ease of illustration, logical representations of many of these electrical connections have been omitted from FIGS. 2-17.

During operation of the vehicle, pump 72 draws hydraulic fluid from fluid supply, sump or reservoir 74 and supplies it to main regulator valve 76. Main regulator valve 76 distributes the fluid to main passage 100 at a main or "line" pressure. In general, the main pressure defines a range including a minimum system pressure and a maximum system pressure for main passage 100. In the illustrated embodiment, the main pressure is in the range of about 50-250 pounds per square inch (psi).

Main regulator valve 76 distributes fluid at the main pressure to actuator feed regulator valve 70, RELS valve 68, converter flow valve 78, trim valves 60, 62, and manual valve MV1, directly via main passage 100.

Main regulator valve 76 is in fluid communication with main modulator actuator 46 via passage 114. Actuator 46 is also in fluid communication with control passage 102. Actuator 46 is actuated by electronic or electrical control 22 to modulate or control the fluid pressure level in main passage 100 via main regulator valve 76.

Control 22 selectively provides signals to actuator 46 based on engine output torque, throttle position, or other parameters or factors. In general, the output pressure of actuator 46 in passage 114 is variable and less than the main pressure. In the illustrated embodiment, actuator 46 is a normally high solenoid valve with an output pressure in passage 114 varying in the range of about 0-110 psi.

When fluid pressure in main passage 100 is satisfied, main regulator valve 76 distributes fluid pressure to converter feed passage 104, which is in fluid communication with converter flow valve 78, relief valve 98 and lube regulator valve 86.

Converter flow valve 78 distributes fluid in passage 104 to fluid chamber 108 of torque converter 14.

Converter flow valve 78 and/or relief valve 98 distributes fluid from passage 104 to cooler system 110. In general, cooler system 110 is operable to maintain the temperature of the hydraulic fluid within a suitable temperature range. In the illustrated embodiment, the operating temperature of the hydraulic fluid is in the range of about −40° C. to about +120° C.

Lube regulator valve 86 distributes fluid from passage 104 and/or cooler 110 to lubrication system fluid chamber 112. Lube system fluid chamber 112 provides fluid to lubricate various components of the transmission 18, such as components of the planetary gear sets including gears and bearings.

Relief valve 98 prevents overpressure of converter 14, during a cold startup, for example. After the fluid requirements of torque converter fluid chamber 108, lube system fluid chamber 112 and cooler system fluid chamber 110 are met, any remaining fluid may be returned to a pump return passage 106. During "normal" operation in which pump 72 is drawing fluid from reservoir 74, fluid in pump return passage 106 is at a negative pressure. In the illustrated embodiment, the negative pressure is in the range of about −2 psi.

The fluid pressure in converter feed passage 104, which may be referred to as the "converter" pressure, is generally less than the main pressure. In the illustrated embodiment, the converter pressure is in the range of about 100 psi.

Actuator feed regulator valve 70 and actuator 46 are in direct fluid communication with, and thereby maintain fluid at a "control" pressure, in control passage 102. Control passage 102 is in direct fluid communication with, and thereby supplies control pressure to, actuators 30, 32, 34, 36, 38, 40, 42, 44, and 46, boost valve 80, and check valves 88, 90, 92. The control pressure is generally less than the main pressure and greater than the converter pressure. In the illustrated embodiment, the control pressure is in the range of about 110 psi.

A torque converter clutch control subsystem, TCC, includes actuator 40, fluid passage 180, and torque converter flow valve 78. The TCC subsystem controls engagement and disengagement of the torque converter clutch or "lockup" clutch 26. To apply the torque converter clutch 26, pressure in the torque converter fluid chamber 108 is reduced. The pressure in chamber 108 is reduced by actuating actuator 40 to provide control pressure in passage 180, thereby applying control pressure to valve head 186 of converter flow valve 78, causing valve 78 to move to the pressure set position shown in FIGS. 7-13. When valve 78 is in the pressure set position, land 188 opens converter fluid chamber 108 to exhaust to apply the clutch 26. As shown by Table 1, in the illustrated embodiment, the torque converter clutch 26 is applied in the $3^{rd}$ through $8^{th}$ forward ratios and released in the reverse, neutral, first and second ranges of the transmission 18. However, since the torque converter clutch 26 is controlled independently of the other clutches, it may be applied or released at any time, including during neutral and reverse. For example, torque converter clutch 26 may be applied for power take-off (PTO) applications.

In the illustrated embodiment, actuator 40 is a normally low solenoid. As such, when actuator 40 is not actuated, control 22 provides little or no electrical input to actuator 40, and the output pressure of actuator 40 is zero or nearly zero psi. To actuate actuator 40, control 22 supplies electrical input to actuator 40, and the output pressure of actuator 40 is at or near the control pressure.

A reduced engine load at stop subsystem (RELS) includes actuator 38, RELS valve 68, passage 210, and torque converter flow valve 78. In general, a reduced engine load at stop system is a control that enables an additional mechanical disconnection between the drive unit 12 and the torque converter 14 to achieve greater engine efficiency when it is desired to slow, stop or idle the vehicle. When the RELS system is activated the additional disconnection is provided by mechanically decoupling the drive unit 12 from the torque converter pump (in addition to the mechanically decoupling of the pump from the turbine, which is accomplished by release of the torque converter clutch 26). In the illustrated embodiment, the RELS feature is provided by disengaging the pump clutch 28 of the torque converter 14 while the torque converter clutch 26 is also disengaged. Additional description of a control for a torque converter having both a torque converter clutch and a pump clutch may be found in Long et. al., U.S. Provisional Patent Application Ser. No. 61/045,141, filed Apr. 15, 2008, which is incorporated herein by this reference. An example of a reduced engine load at stop control may be found in U.S. Pat. No. 7,338,407 to Long et al., issued Mar. 4, 2008. In general, RELS valve 68 is multiplexed via actuators 38, 40 to control both the torque converter clutch 26 and pump clutch 28.

Figure 5:
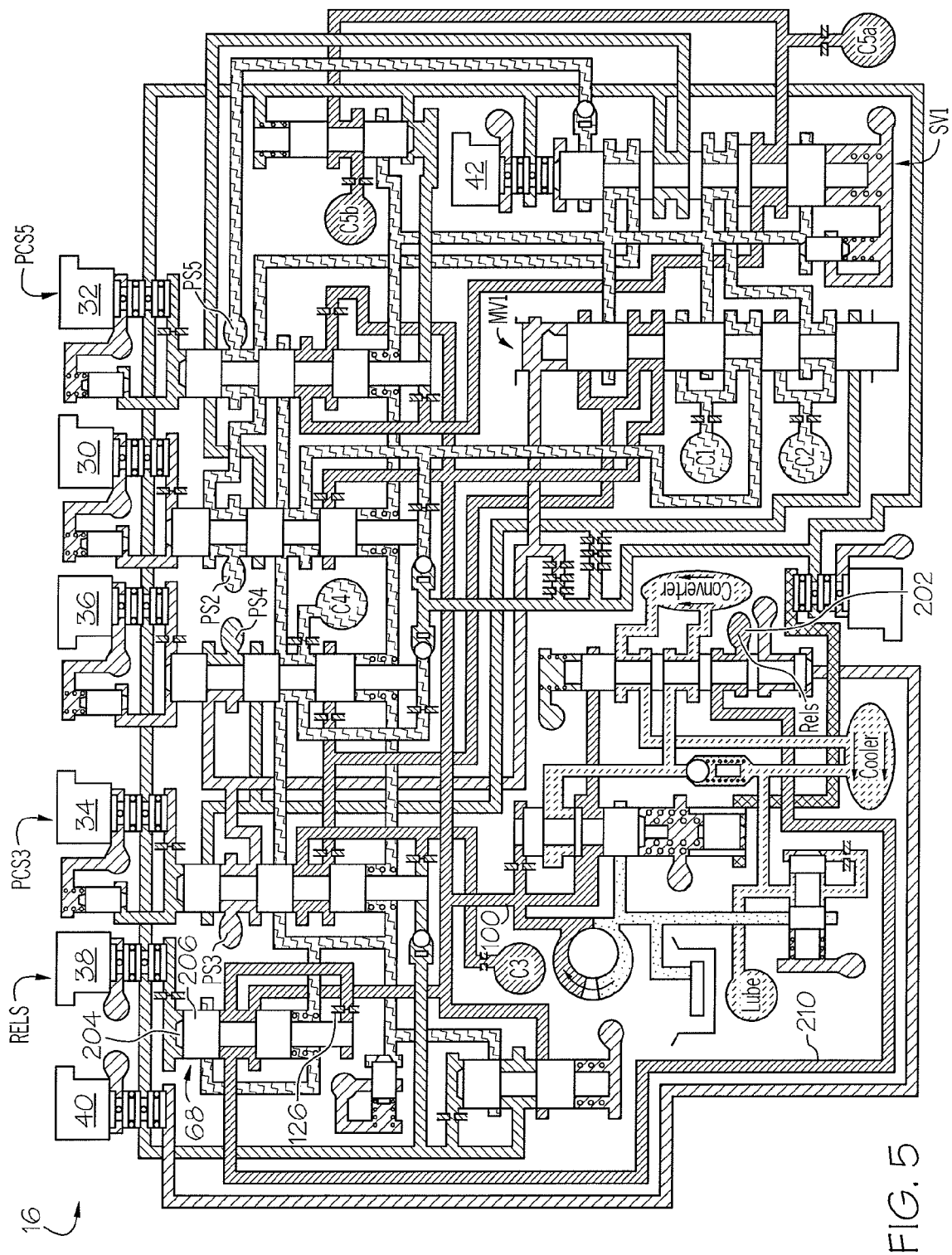

An example of an activation of the RELS feature in the first forward ratio is shown in FIG. 5. Torque converter clutch 26 is disengaged, as converter flow valve 78 is in the spring set position and converter fluid chamber 108 is at the converter pressure. To activate the RELS feature, actuator 38 is actuated, providing control pressure in passage 178, which is applied to the valve head 204 as shown in FIG. 5. Stroking the RELS valve 68 causes land 206 to open passage 210 to connect with main passage 100, thereby providing main pressure to RELS fluid chamber 202. The pressure increase in RELS fluid chamber 202 causes pump clutch 28 to disengage.

In the illustrated embodiment, actuator 38 is a normally low solenoid. As such, when actuator 38 is not actuated, control 22 provides little or no electrical input to actuator 38, and the output pressure of actuator 38 is zero or nearly zero psi. To actuate actuator 38, control 22 supplies electrical input to actuator 38. When actuated, the output pressure of actuator 38 is at or near the control pressure.

The shift mechanisms, i.e., C1, C2, C3, C4, C5 of transmission 18 are controlled by trim systems PCS2, PCS5, PCS3, and PCS4. Each of the trim systems PCS2, PCS5, PCS3, and PCS4 includes an actuator 30, 32, 34, 36, a trim valve 60, 62, 64, 66, a trim valve feed passage 170, 172, 174, 176, a restrictor 122, 124, 120, 118 disposed in passages 170, 172, 174, 176, an accumulator 50, 52, 54, 56, and a pressure switch PS2, PS5, PS3, PS4.

Trim system PCS2 includes actuator 30, accumulator 50, trim valve 60, feed passage 170, restrictor 122, pressure switch PS2, valve-to-shift mechanism passage 218, which is in fluid communication with shift mechanism fluid chamber C2 via manual valve MV1. Restrictors 134, 156 are disposed in passage 218, with restrictor 134 being disposed nearer to trim valve 60 and restrictor 156 being disposed nearer to the inlet to fluid chamber C2.

In the illustrated embodiment, actuator 30 is a normally high solenoid valve. As such, when control 22 provides little or no electrical input to actuator 30, the output pressure of actuator 30 in passage 170 is at or near the control pressure. When control 22 supplies electrical input to actuator 30, the output pressure of actuator 30 is zero or nearly zero psi.

Trim system PCS5 includes actuator 32, accumulator 52, trim valve 62, feed passage 172, restrictors 124, 136, 148, pressure switch PS5, valve to valve passage 220, which is in fluid communication with boost valve 80, and valve to valve passage 222, which is in fluid communication with shift valve SV1.

In the illustrated embodiment, actuator 32 is a normally high solenoid valve. As such, when control 22 provides little or no electrical input to actuator 32, the output pressure of actuator 32 in passage 172 is at or near the control pressure. When control 22 supplies electrical input to actuator 32, the output pressure of actuator 32 is zero or nearly zero psi.

Boost valve 80 is in fluid communication with fluid chamber C5b via valve to shift mechanism passage 200. Restrictor 138 is disposed in passage 200 near the inlet to fluid chamber C5b. In general, boost valve 80 is actuated whenever trim valve 62 reaches a predetermined level (which may be set by adjusting the return spring on boost valve 80). The predetermined level is set to ensure that the clutch C5 is fully applied. In the illustrated embodiment, the predetermined level of trim valve 62 for actuating boost valve 80 is in the range of about 50 to about 60 psi. As boost valve 80 is in fluid communication with both chamber C5a and C5b, boost valve 80 is configured as a dual area activation valve similar to one disclosed in Long et al., U.S. patent application Ser. No. 11/856,751, filed Sep. 18, 2007.

Shift valve SV1 is in fluid communication with fluid chamber C5a via valve to shift mechanism passage 198. Restrictor 162 is disposed in passage 198 near the inlet to fluid chamber C5a. Shift valve SV1 is also in fluid communication with fluid chamber C5b via passage 198 and boost valve 80. Actuator 42 is operably coupled to shift valve SV1. In the illustrated embodiment, actuator 42 is a normally low solenoid. As such, when actuator 42 is not actuated, control 22 provides little or no electrical input to actuator 42, and the output pressure of actuator 42 is zero or nearly zero psi. To actuate actuator 42, control 22 supplies electrical input to actuator 42. When actuated, the output pressure of actuator 42 to valve head 250 is at or near the control pressure.

Manual valve MV1 is in fluid communication with shift mechanism fluid chamber C1 via valve to shift mechanism passage 190. Restrictor 158 is disposed in passage 190 near the inlet to fluid chamber C1. Manual valve MV1 is also in fluid communication with shift mechanism fluid chamber C2 via passage 192. Restrictor 156 is disposed in passage 192 near the inlet to fluid chamber C2. The position of manual valve MV1 is changed by the vehicle operator.

Shift valve SV1 and manual valve MV1 are in fluid communication with each other via a plurality of valve to valve passages 224, 226, 228. Check valve 94 is disposed in passage 236, which connects shift valve SV1 to trim system PCS5. In this way, trim systems PCS2 and PCS5 are multiplexed via shift valves SV1 and manual valve MV1 to selectively control the engagement and disengagement (or application and release) of shift mechanisms C1, C2, and C5.

Trim system PCS3 selectively controls engagement and disengagement of shift mechanism C3. Trim system PCS3 includes actuator 34, accumulator 54, trim valve 64, pressure switch PS3, feed passage 174, restrictor 120 disposed in feed passage 174, valve to shift mechanism passage 194 and restrictor 132 disposed in passage 194 near the inlet to shift mechanism fluid chamber C3. Actuator 34 is a normally low solenoid. As such, when control 22 provides little or no electrical input to actuator 34, the output pressure of actuator 34 is zero or nearly zero psi. When control 22 supplies electrical input to actuator 34, the output pressure of actuator 34 in passage 174 is at or near the control pressure.

Trim system PCS4 selectively controls engagement and disengagement of shift mechanism C4. Trim system PCS4 includes actuator 36, accumulator 56, trim valve 66, pressure switch PS4, feed passage 176, restrictor 118 disposed in feed passage 176, valve to shift mechanism passage 196 and restrictor 150 disposed in passage 196 near the inlet to shift mechanism fluid chamber C4. Actuator 36 is a normally low solenoid. As such, when control 22 provides little or no electrical input to actuator 36, the output pressure of actuator 36 is zero or nearly zero psi. When control 22 supplies electrical input to actuator 36, the output pressure of actuator 36 in passage 176 is at or near the control pressure.

In the illustrated embodiment, an accumulator 50, 52, 54, 56 is in fluid communication with each of the trim systems PCS2, PCS3, PCS4, PCS5. Such accumulators or similar devices may be used to hydraulically filter step changes in the output pressure of the respective actuators 30, 32, 34, 36, or for other purposes. However, it will be understood by those skilled in the art that the inclusion of accumulators 50, 52, 54, 56 is considered optional.

Table 1 shows the components of control 16 that are actuated when each of the various operational modes of transmission 18 are achieved. Table 1 also shows the shift mechanism(s) and torque converter coupler(s) that are typically activated in each mode. The asterisk is used to indicate that what is shown is a typical configuration. However, the torque converter clutch can be actuated at any time.

TABLE 1

STEADY STATE MECHANIZATION

| Range | Shift Mechanism(s) Applied | Trim System(s) Actuated | Shift Valve Actuated? | Pressure Switch(s) Actuated | Torque Converter Clutch Status* | Pump Clutch Status |
|---|---|---|---|---|---|---|
| Reverse | C2, C5 | PCS2, PCS5 | No | PS2, PS4 | Released | Applied |
| Neutral | C5 | PCS5 | No | PS3 | Released | Applied |
| $1^{st}$ | C3, C5 | PCS3, PCS5 | No | None | Released | Applied |
| RELS $1^{st}$ | C3, C5 | PCS3, PCS5 | No | None | Released | Released |
| $2^{nd}$ | C4, C5 | PCS4, PCS5 | No | PS3, PS4 | Released | Applied |
| $3^{rd}$ | C1, C5 | PCS2, PCS5 | No | PS2, PS3 | Applied | Applied |
| $4^{th}$ | C1, C4 | PCS2, PCS4 | No | PS2, PS3, PS4, PS5 | Applied | Applied |

TABLE 1-continued

STEADY STATE MECHANIZATION

| Range | Shift Mechanism(s) Applied | Trim System(s) Actuated | Shift Valve Actuated? | Pressure Switch(es) Actuated | Torque Converter Clutch Status* | Pump Clutch Status |
|---|---|---|---|---|---|---|
| 4th, | C1, C4 | PCS2, PCS4 | Yes | PS3, PS4 | Applied | Applied |
| 5th, | C1, C3 | PCS2, PCS3 | Yes | None | Applied | Applied |
| 6th, | C1, C2 | PCS2, PCS5 | Yes | PS3, PS5 | Applied | Applied |
| 7th, | C2, C3 | PCS3, PCS5 | Yes | PS2, PS5 | Applied | Applied |
| 8th, | C2, C4 | PCS4, PCS5 | Yes | PS2, PS3, PS4, PS5 | Applied | Applied |

Another chart showing additional details of the steady state mechanization is provided in Long et al., U.S. Provisional Patent Application Ser. No. 61/045,141, filed Apr. 15, 2008, which is incorporated herein by this reference. The configuration of control 16 during the modes shown in Table 1 above will now be described.

Reverse

Figure 2:
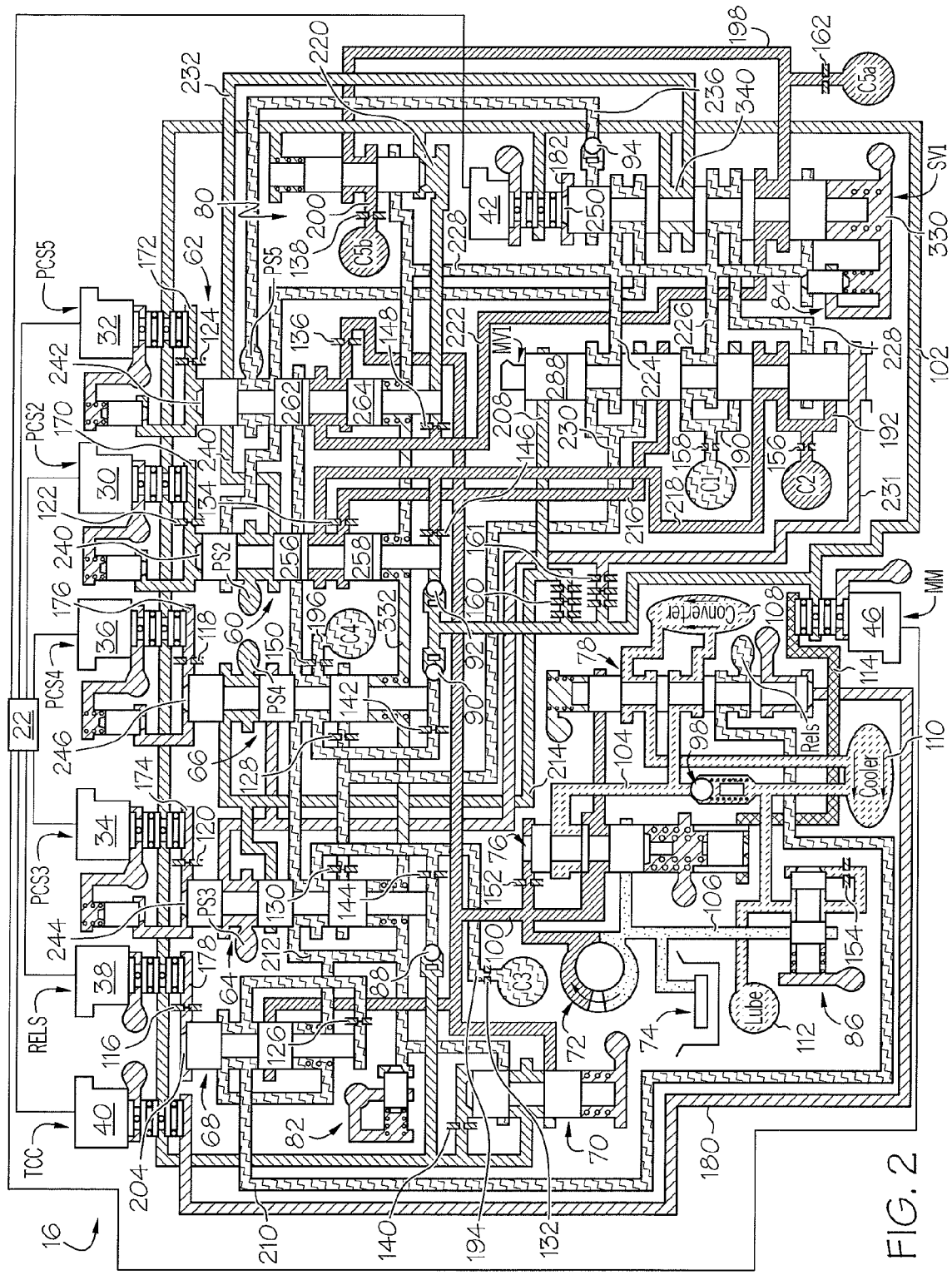
FIG. 2 is a schematic diagram of one embodiment of a control system for a multi-speed transmission for a motor vehicle, showing a fluid passage arrangement and fluid pressure configuration for a reverse mode of operation of the motor vehicle.

When the reverse operational mode is requested, e.g. by the vehicle operator changing the position of range selector 24, control 16 assumes the configuration shown in FIG. 2, in which fluid chambers C2, C5a and C5b are pressurized and pressure switches PS4 and PS2 detect control pressure. Control pressure is applied to valve heads 240 and 242, by actuation of actuators 30 and 32, of trim systems PCS2, PCS5.

Actuation of actuator 30 causes downward translation of valve 60, thereby causing land 256 to move. As a result, pressure switch PS2 is connected to control passage 102 via valve to valve passage 232, and valve chamber 340 of shift valve SV1, thereby causing PS2 to detect the control pressure. Movement of lands 256, 258 connects valve to valve passage 218 with valve to valve passage 216. With manual valve MV1 in the reverse position, valve to shift mechanism passage 192 is connected to valve to valve passage 218. Passage 216 is connected to main passage 100. As a result, main pressure is applied to fluid chamber C2 via restrictor 156. Restrictor 156 and similar structures are configured to reduce the variation in the amount of time it takes to fill the clutch due to temperature variations. In the illustrated embodiment, restrictor 156 in a sharp-edged orifice.

Actuation of actuator 32 applies control pressure to valve head 242 of trim valve 62. Downward translation of trim valve 62 causes land 262 to move so that pressure switch PS5 is connected to exhaust passage 234, thereby causing PS5 to detect zero or nearly zero pressure. Movement of lands 262, 264 connects valve to valve passage 222 with main passage 100, thereby applying main pressure to fluid chambers C5a and C5b via passage 198, shift valve SV1, and restrictors 136, 138 and 162. With valve 62 actuated, spool portion 328 is interposed in fluid passage 220, causing control pressure to be applied to boost valve 80. As a result, lands 308, 310 move so that fluid chamber C5b is connected with passage 198. Thus, in the reverse mode, actuation of trim valves 60, 62, and boost valve 80, results in the engagement of shift mechanisms C2 and C5.

Also in the reverse mode, pressure switch PS4 is activated by control pressure even though trim system PCS4 is not actuated by control 22. This is due to the reverse position of manual valve MV1, in which land 288 blocks passage 208 to provide control pressure from passage 102 to passage 214 and pressure switch PS4.

Neutral

Figure 3:
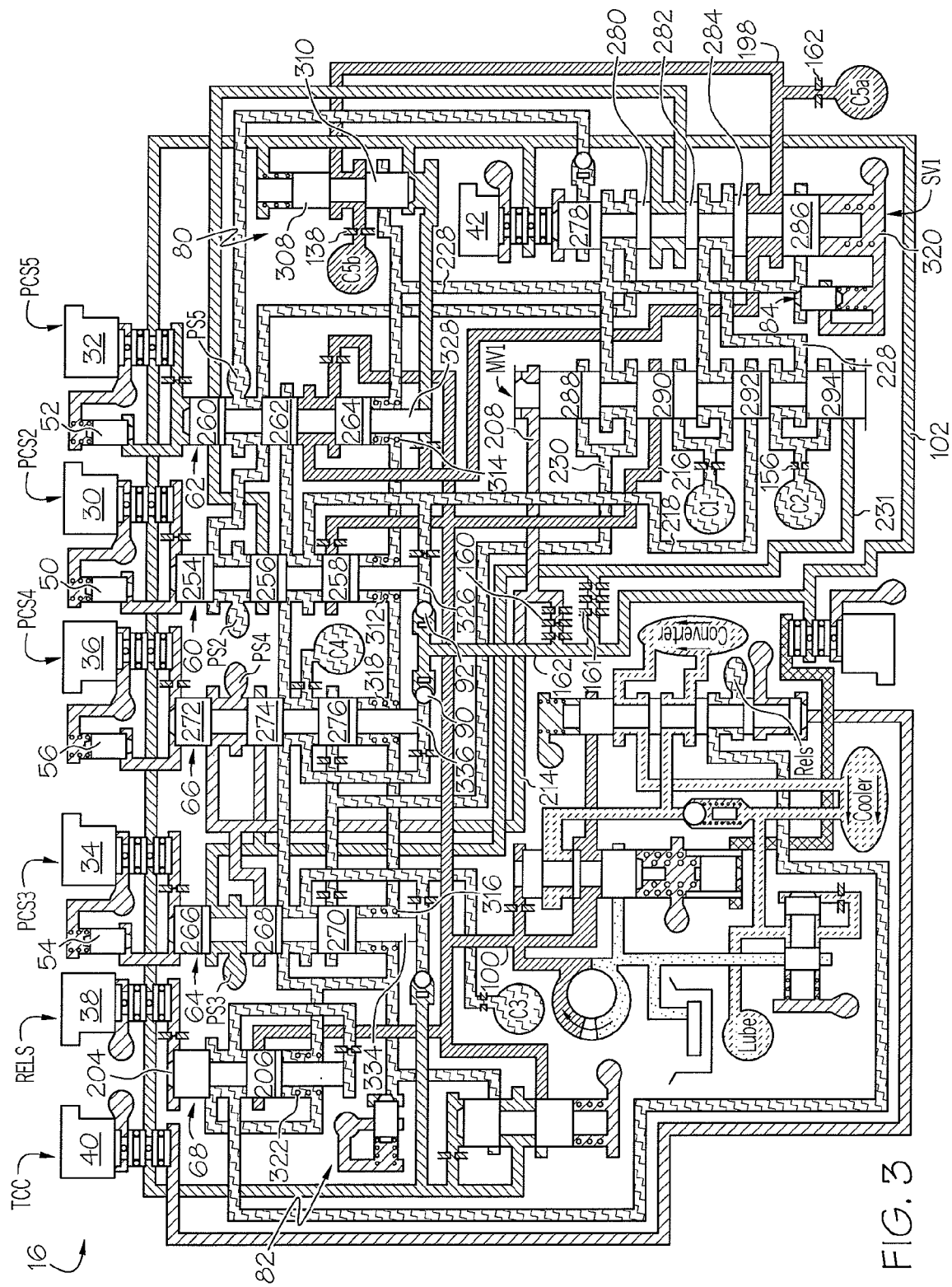
FIG. 3 is a schematic diagram of the embodiment of FIG. 2, showing a fluid passage arrangement and fluid pressure configuration for a neutral mode of operation of the motor vehicle.

When the neutral operational mode is requested, e.g. by the vehicle operator changing the position of range selector 24, control 16 assumes the configuration shown in FIG. 3. In neutral, only one shift mechanism, C5 is actuated, via actuation of trim system PCS5 and boost valve 80 as described above. None of the other trim systems PCS2, PCS3, PCS4 are actuated, and shift valve SV1 is not actuated. However, fluid chambers C5a and C5b remain pressurized, and pressure switch PS3 is actuated. Check valves 90, 92 retain control pressure in passage 102 and prevent it from affecting the configuration of valves 60, 66.

With manual valve MV1 in the neutral position, passage 208 is connected to exhaust. Restrictors 160 are a series of orifices that act as a wasting system and prevent pressure from building in passage 208. De-activation of trim system PCS2 (relative to FIG. 2) and the resulting movement of lands 254, 256, 258, disconnects passage 218 from passage 216 and from fluid chamber C2. Due to the position of MV1, fluid chamber C2 is connected with passage 228, which is in fluid communication with EBF valves 82, 84. Fluid chamber C2 is thereby exhausted. Restrictor 156 moderates the rate of exhaustion to provide smoother disengagement of shift mechanism C2.

Movement of land 294 of manual valve MV1 increases the fluid pressure on pressure switch PS3 by blocking passage 231, which is at the control pressure by virtue of its connection to control passage 102 via restrictors 161. Thus, PS3 is actuated.

In general, the various forward speed ratios of transmission 18 become available when the vehicle operator places the manual valve MV1 in the "drive" position shown in FIGS. 4-13. In the illustrated embodiment, manual valve MV1 is manually translated downward relative to passage 208 to achieve the drive position.

First Forward Ratio

Figure 4:
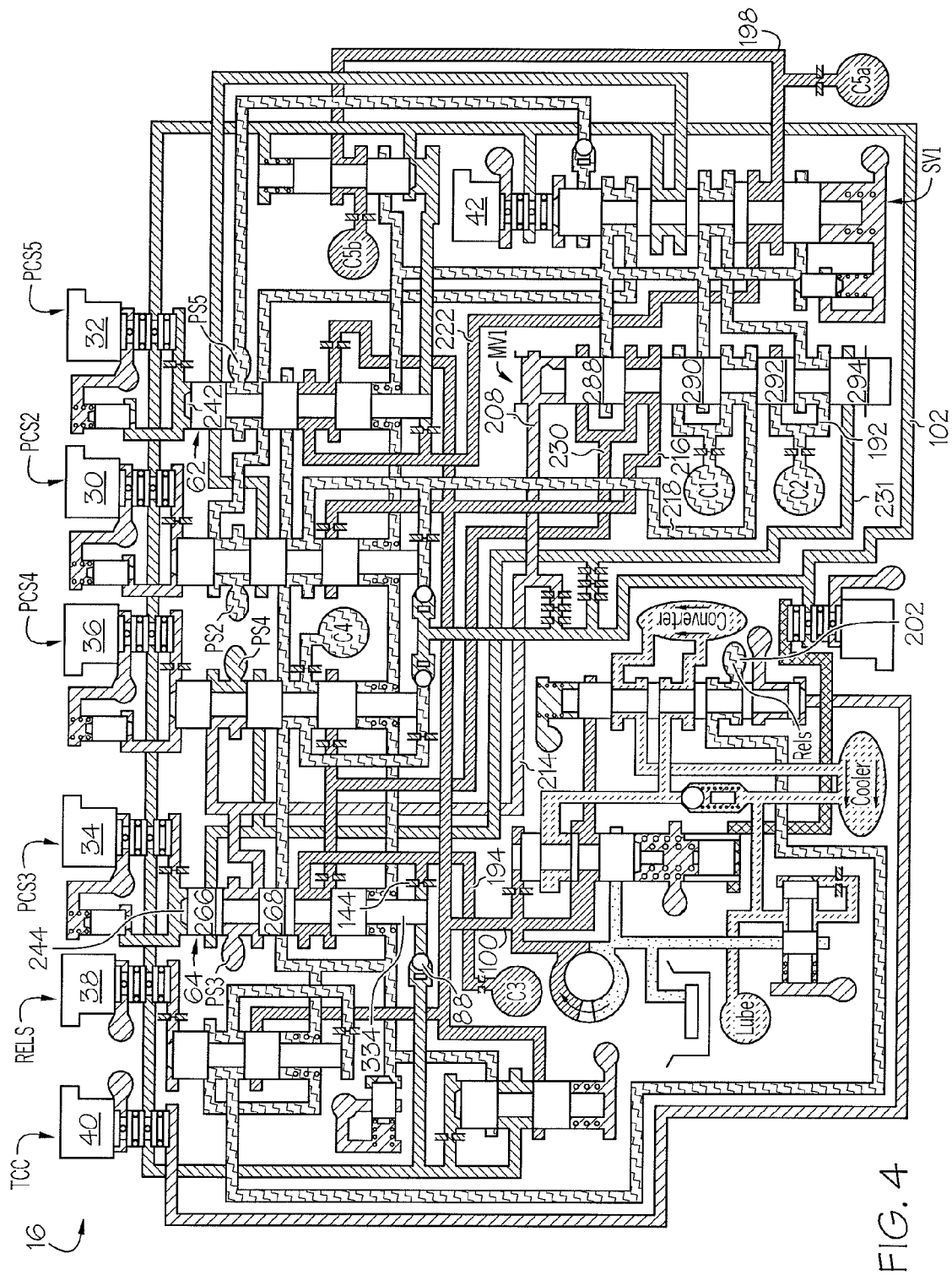
FIGS. 4-13 are schematic diagrams of the embodiment of FIG. 2, showing fluid passage arrangements and fluid pressure configurations for various operational ranges of a motor vehicle, including first through eighth forward speed ratios.

After the vehicle operator has placed the transmission 18 in "drive", when the first forward ratio is requested, e.g. automatically by control 22 or by range selector 24, control 16 assumes the configuration shown in FIG. 4. Control pressure is applied to valve heads 242 and 244 causing movement of trim valves 62, 64. Relative to the neutral configuration shown in FIG. 3, the configuration of trim system PCS5 remains the same. However, in the first forward ratio shown by FIG. 4, main pressure is applied to engage shift mechanism C3 as a result of actuation of actuator 34 and movement of manual valve MV1 into the drive position. Passage 216 is in fluid communication with main passage 100 and passage 230. Passage 230 is in fluid communication with valve to shift mechanism passage 194. Shift mechanism C5 remain applied due to the connection of passages 198, 222 through shift valve SV1 due to activation of valve 62.

None of pressure switches PS2, PS3, PS4, PS5 are activated by control or main pressure in the first forward ratio. Relative to neutral, PS3 is deactivated in FIG. 4 because passage 214 is in fluid communication with exhaust passage 208 (rather than passage 231, as in FIG. 3) due to the position of lands 266, 268 and manual valve MV1. In comparison to FIG. 5, which shows the RELS subsystem in an activated state; in the "normal" first forward ratio shown by FIG. 4, the RELS fluid chamber 202 is not pressurized because actuator 38 and RELS valve 68 are not actuated.

Second Forward Ratio

Figure 6:
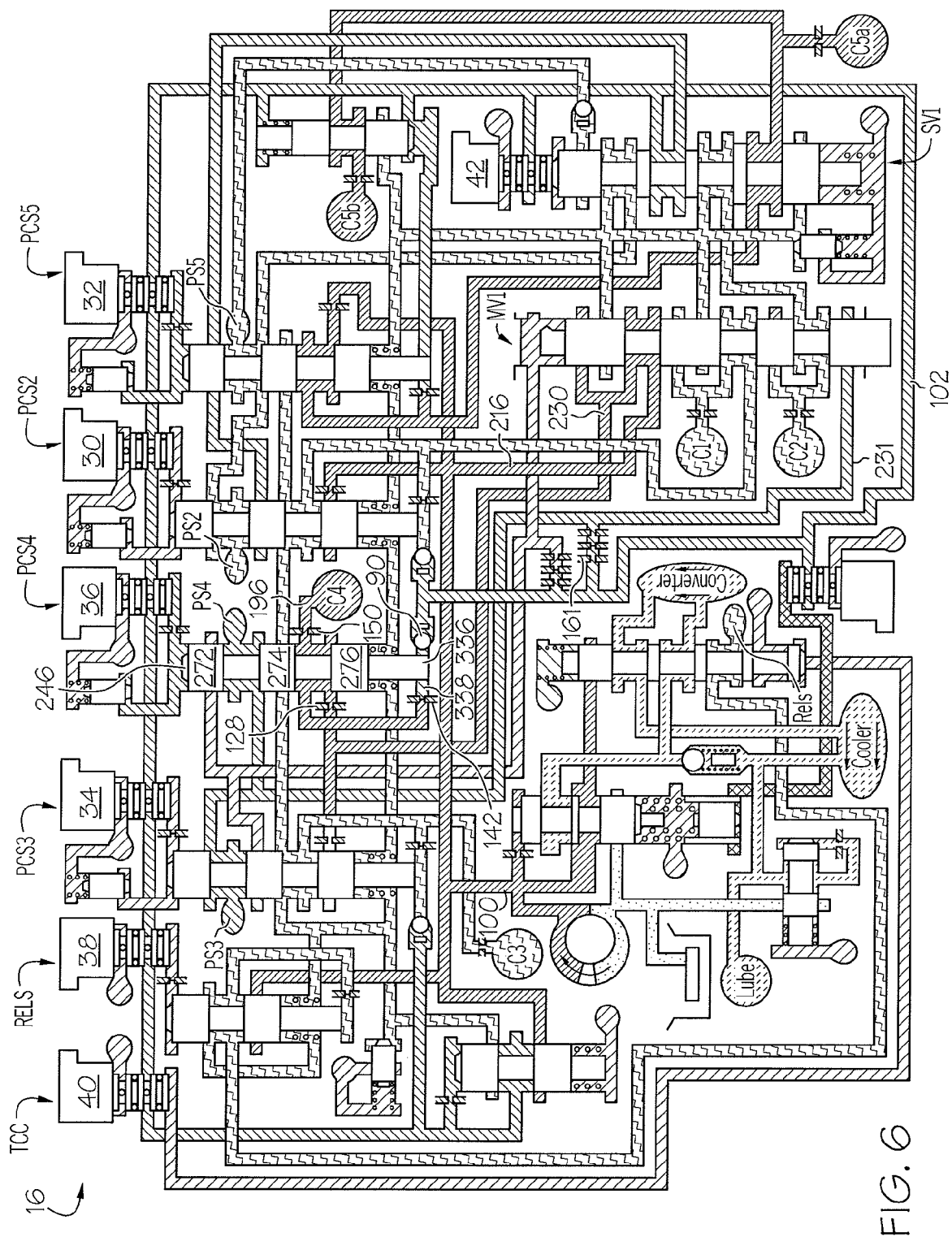

When the second forward ratio is requested, e.g. automatically by control 22 or by range selector 24, control 16 assumes the configuration shown in FIG. 6. In the second forward ratio, the configuration of PCS2, PCS5, and shift valve SV1 remains the same as in the first forward ratio. PCS3 is not actuated, assuming the same position as in FIG. 2. Fluid chamber C3 is exhausted and pressure switch PS3 is pressurized, indicating release of shift mechanism C3. Control 22 sends electrical input to actuator 36 to actuate PCS4. Control pressure applied to valve head 246 causes downward translation of lands 272, 274, 276. As a result, pressure switch PS4 is connected with control passage 102 via passage 231 and restrictors 161. Pressure switch PS4 is thereby activated by control pressure. Also, valve to shift mechanism passage 196 is connected with main passage 100 via passages 230 and 216 and restrictors 150, 128. Shift mechanism fluid chamber C4 therefore receives main pressure via restrictors 128, 150. With spool portion 336 interposed in passage 338 as a result of activation of trim system PCS4, fluid in passage 338 is at the control pressure. Check valve 90 connects passage 338 with control passage 102.

Third Forward Ratio

Figure 7:
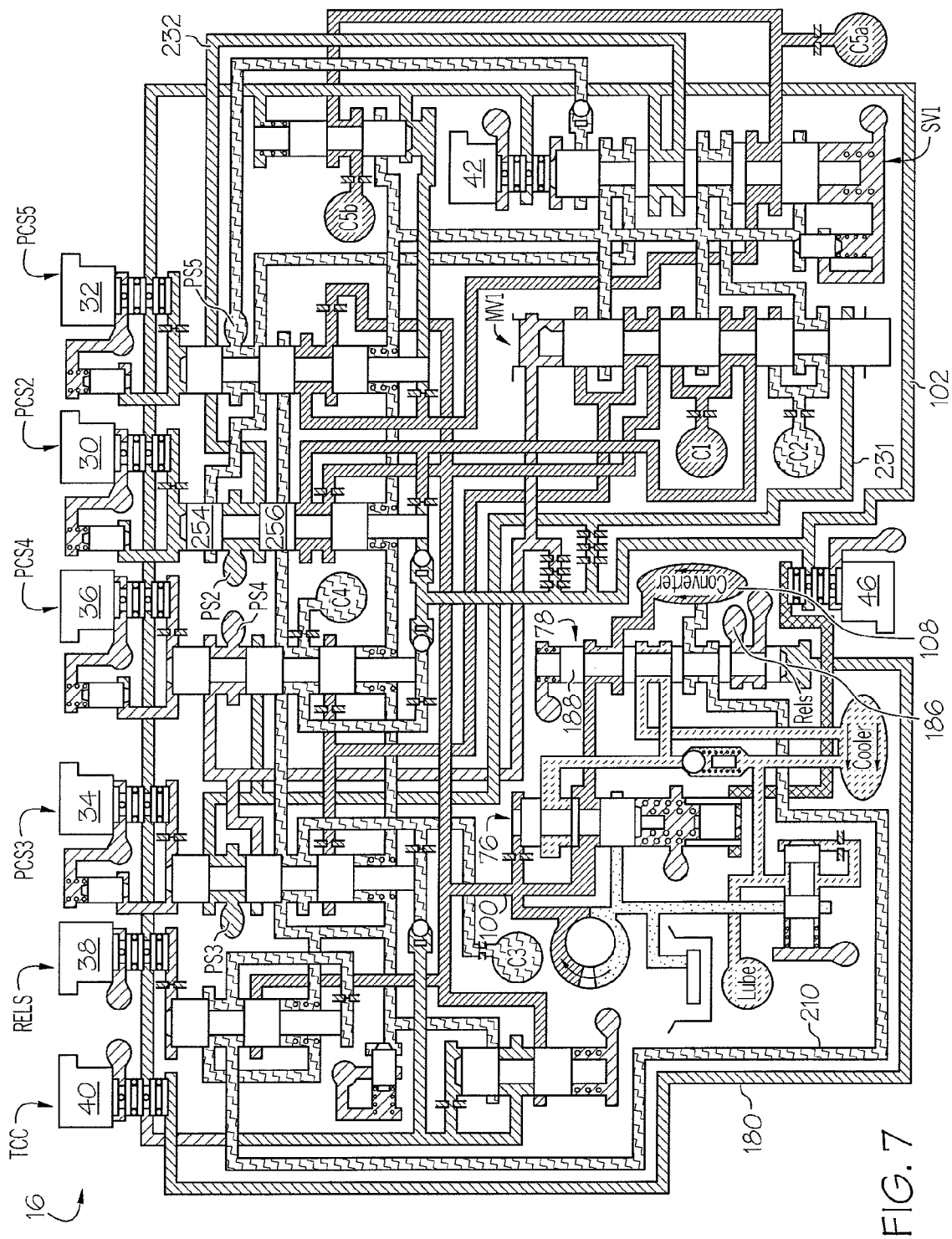

When the third forward ratio is requested, e.g. automatically by control 22 or by range selector 24, control 16 assumes the configuration shown in FIG. 7. In the third forward ratio, PCS5 and shift valve SV1 maintain the same position as in the first and second ratios. PCS2 is actuated, connecting PS2 with control pressure in the same manner as described above with reference to FIG. 2. With manual valve MV1 in the drive position and PCS2 actuated, passage 218 is in fluid communication with valve to shift mechanism passage 190. Thus, main pressure is applied to fluid chamber C1 through restrictor 158 to engage shift mechanism C1. Trim system PCS4 is deactuated to release shift mechanism C4.

In the third forward ratio, pressure switches PS2 and PS3 detect control pressure. Pressure switch PS2 is in fluid communication with control passage 102 via shift valve SV1 and passage 232, as a result of downward translation of lands 254, 256. Pressure switch PS3 remains activated by control pressure as in FIG. 6.

Also, in the third forward ratio, torque converter clutch 26 is applied. Activator 40 provides control pressure to valve head 186 via passage 180 and converter fluid chamber 108 is connected with main passage 100 due to movement of land 188 to the pressure set position. The torque converter clutch 26 normally remains applied in the third through eighth forward ratios. The pump clutch 28 is normally applied in all ranges, unless the RELS features is activated as shown, for example, in FIG. 5.

Fourth Forward Ratio

Figure 8:
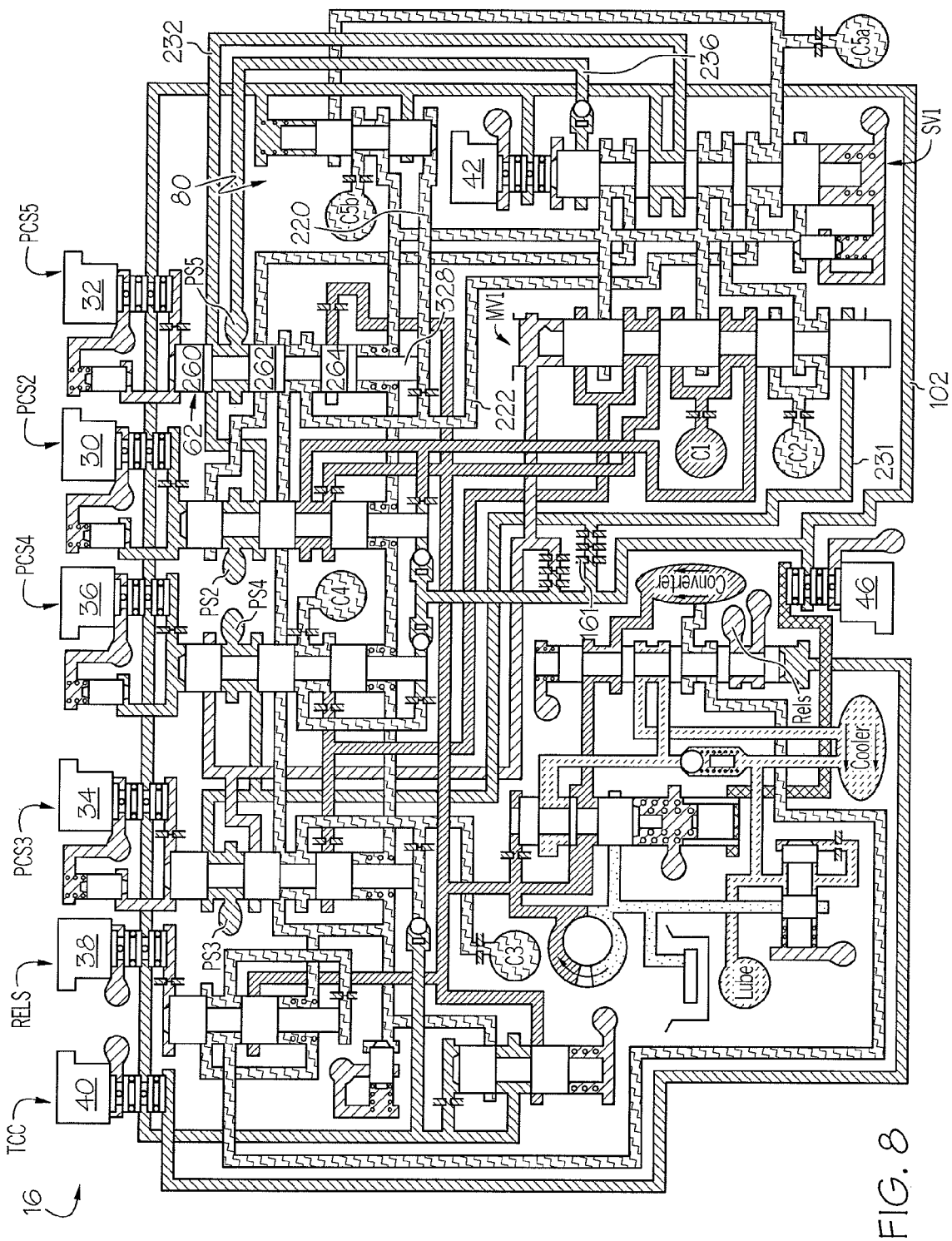

When the fourth forward ratio is requested, e.g. automatically by control 22 or by range selector 24, control 16 assumes the configuration shown in FIG. 8. In the fourth forward ratio, the position of shift valve SV1 and manual valve MV1 remains the same as in FIGS. 4-7, but trim system PCS5 is deactuated. Deactuation of PCS5 causes upward translation of valve 62. As a result, land 264 disconnects passage 222 from main passage 100. Also, removal of C5 clutch feedback pressure from passage 220 deactuates boost valve 80. As a result, shift mechanism fluid chambers C5a and C5b are exhausted and shift mechanism C5 is disengaged. Trim system PCS4 is actuated to apply shift mechanism C4 in a similar manner as shown in FIG. 6, described above.

In the fourth forward ratio, pressure switches PS2, PS3, PS4, and PS5 all detect control pressure. With PCS4 actuated and PCS3 deactuated, pressure switches PS3 and PS4 are connected with control passage 102 via passage 231 and restrictors 161. Pressure switches PS2 and PS5 are connected to control passage 102 via passage 232 and shift valve SV1, due to activation of PCS2 and deactivation of PCS5.

Alternative Fourth Forward Ratio

An alternative fourth forward ratio may be requested, either automatically by control 22 or by range selector 24, when it is desired to transition the transmission 18 from the first set of forward ratios 1-4 to the second set of forward ratios 5-8, or for other reasons. In Table 1, the ratios denoted by "prime" are ratios in which the shift valve SV1 is stroked. In the illustrated embodiment, shift valve SV1 is destroked for the lower ranges and provides a low-range limp-home capability. Shift valve SV1 is stroked in the upper ranges and provides a higher-range limp-home capability. Note also that when shift valve SV1 is stroked, shift mechanism C5 can not be applied.

Figure 9:
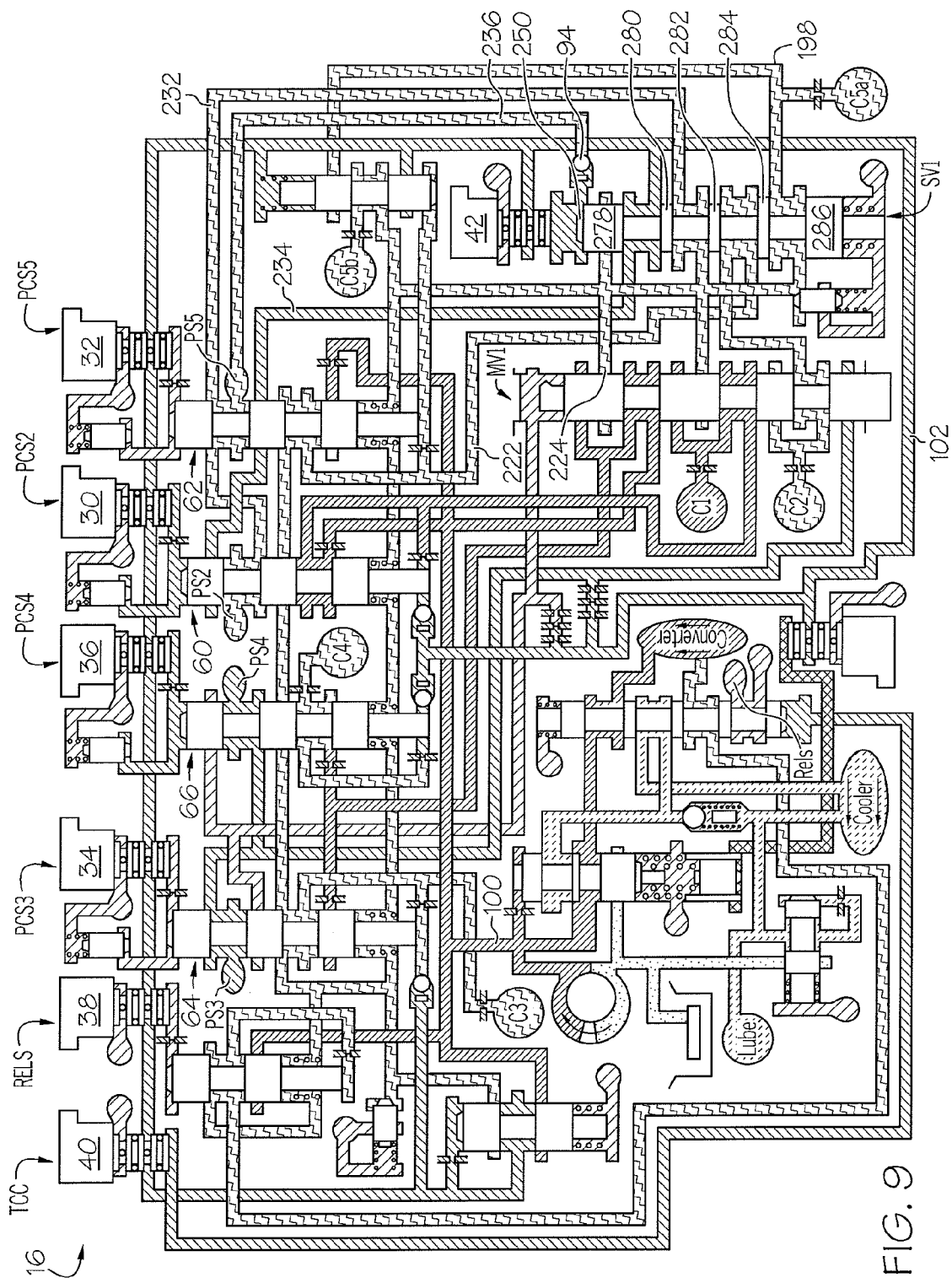

In the alternative fourth forward ratio, control 16 assumes the configuration shown in FIG. 9. Shift valve SV1 is stroked by activation of actuator 42 applying control pressure to valve head 250. Trim valves 60, 62, 64, 66 and manual valve MV1 all maintain the same position as in FIG. 8. Application of control pressure to valve head 250 shifts shift valve SV1 into the pressure set position. Movement of lands 278, 280, 282, 284, 286 alters the connections of passages 224, 226, 228. Downward translation of shift valve SV1 disconnects passage 232 and 236 from control passage 102. As a result, pressure switches PS2 and PS5 are deactuated. Check valve 94 prevents control pressure from entering passage 236. Thus, in the fourth forward ratio of FIG. 8, all of pressure switches PS2, PS3, PS4, PS5 are activated by control pressure, while in the alternative fourth forward ratio of FIG. 9, only pressure switches PS3 and PS4 detect control pressure. This configuration provides a positive means for detecting the position of manual valve MV1.

Fifth Forward Ratio

Figure 10:
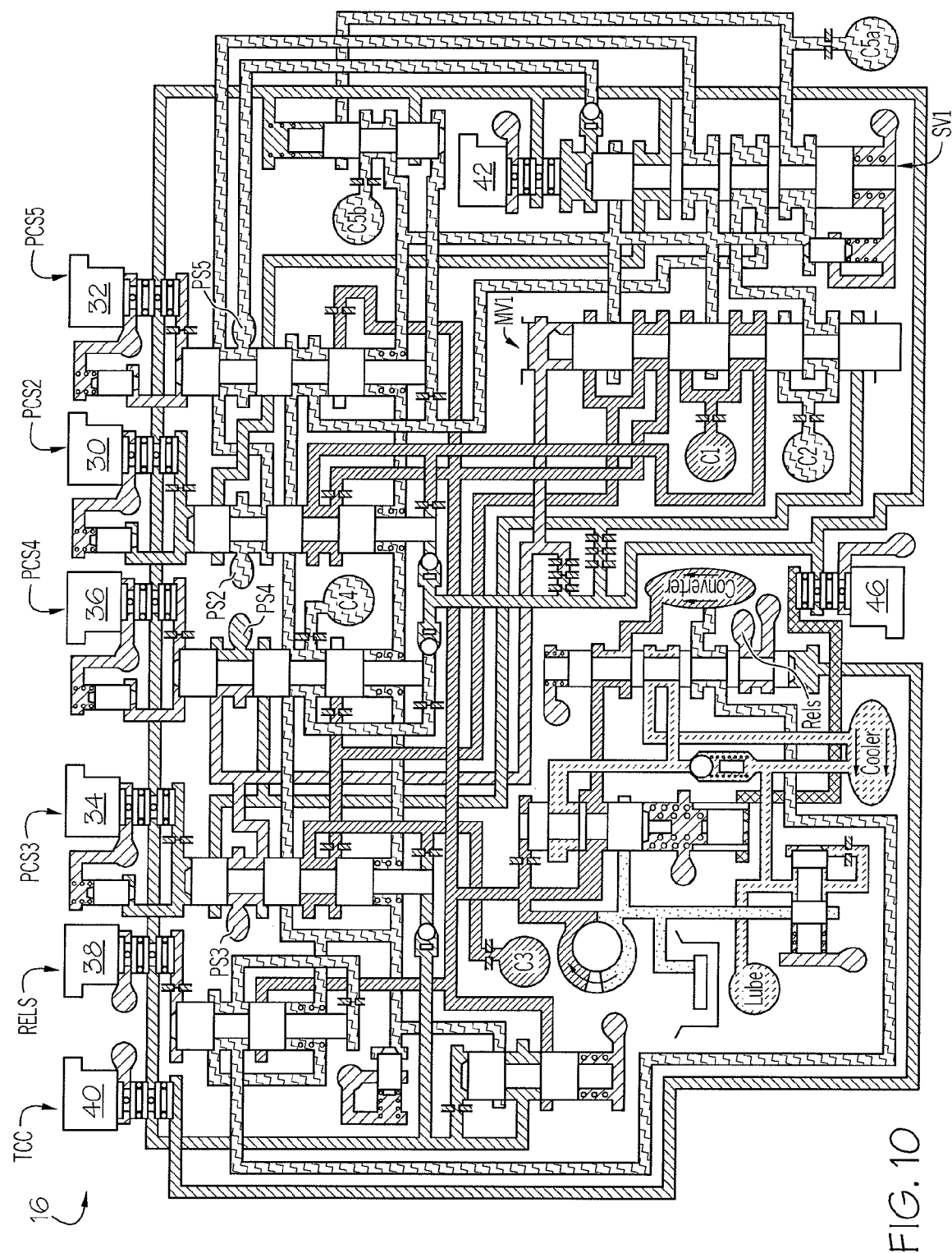

When the fifth forward ratio is requested, e.g. automatically by control 22 or by range selector 24, control 16 assumes the configuration shown in FIG. 10. In the fifth forward ratio, trim systems PCS2, PCS3, shift valve SV1 and manual valve MV1 maintain the same position as in FIG. 9, engaging shift mechanism C1. Trim system PCS3 is actuated to apply shift mechanism C3 in a similar manner to FIG. 5, described above. Trim system PCS4 is deactivated in a similar manner to FIG. 7, described above, releasing shift mechanism C4 and deactivating pressure switch PS4. In the fifth forward ratio, none of the pressure switches PS2, PS3, PS4, PS5 detect control or main pressure, and are therefore not actuated.

Sixth Forward Ratio

Figure 11:
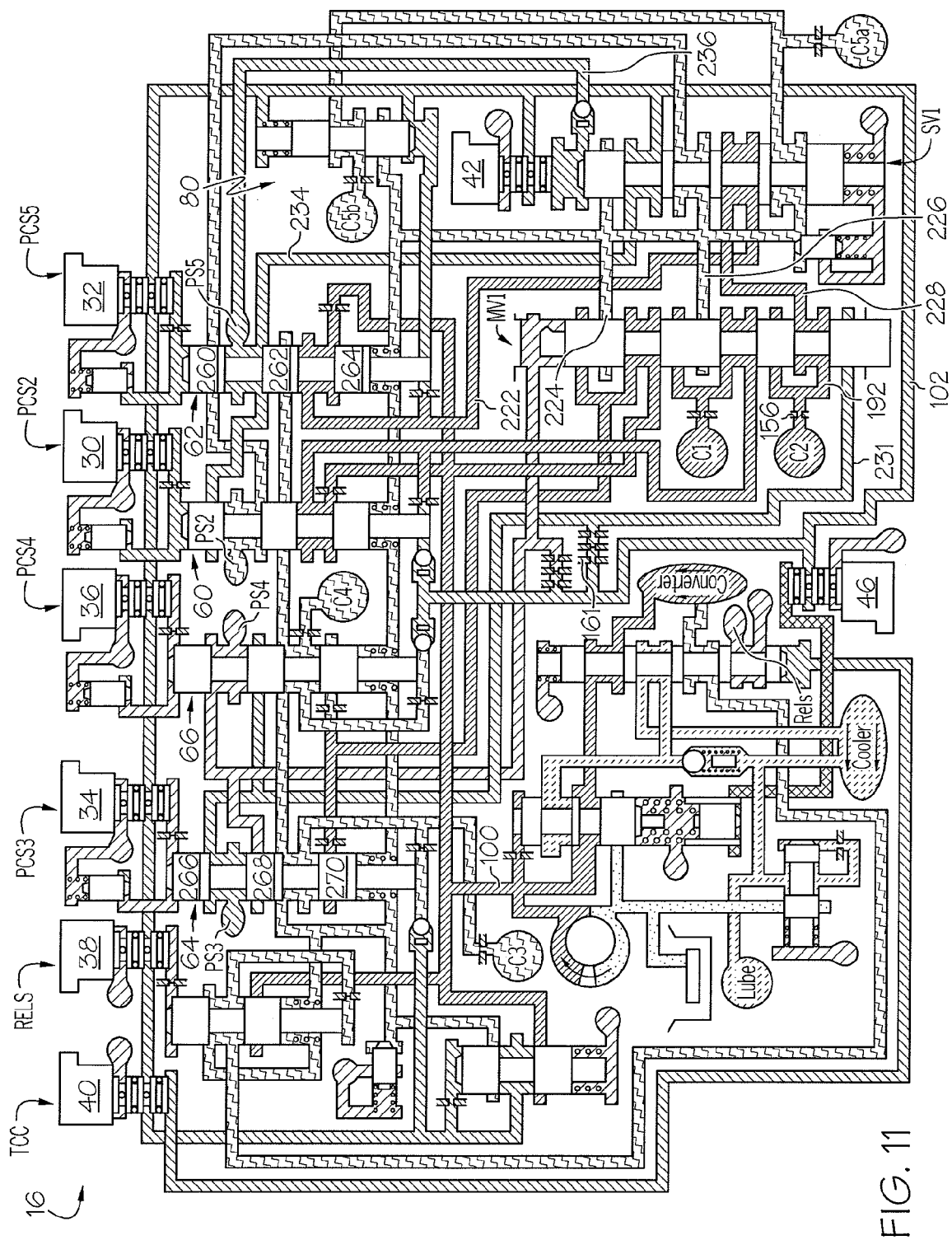

When the sixth forward ratio is requested, e.g. automatically by control 22 or by range selector 24, control 16 assumes the configuration shown in FIG. 11. PCS2, PCS5, and shift valve SV1 are actuated, maintaining engagement of shift mechanism C1 and engaging shift mechanism C2. PCS3 is deactivated in a similar manner as shown in FIG. 2, described above, thereby releasing shift mechanism C3 (relative to FIG. 10). Activation of PCS5 (and thereby, boost valve 80) pressurizes lines 236 and 222. Pressure switch PS5 is thereby activated by control pressure and shift mechanism fluid chamber C2 receives main pressure via passages 228, 192 and restrictor 156. The fluid coupling arrangement of shift valve SV1 and manual valve MV1 permits engagement of C2 and C1 even though the shift valve SV1 and manual valve MV1 are in the same position as in FIG. 10. Also, the arrangement of fluid passages between shift valve SV1 and manual valve MV1 permits engagement of C1 and C2 while C5 is disengaged, as shown in FIG. 11, and also permits engagement of C2 and C5 while C1 is disengaged, as shown in FIG. 2.

In the sixth forward ratio, pressure switches PS3 and PS5 detect control pressure. Pressure switch PS3 is connected to control passage 102 via passage 231 and restrictors 161 (due to upward translation of valve 64, relative to FIG. 10). Pressure switch PS5 is connected to control passage 102 via passage 234 and shift valve SV1, due to downward translation of valve 62.

Seventh Forward Ratio

Figure 12:
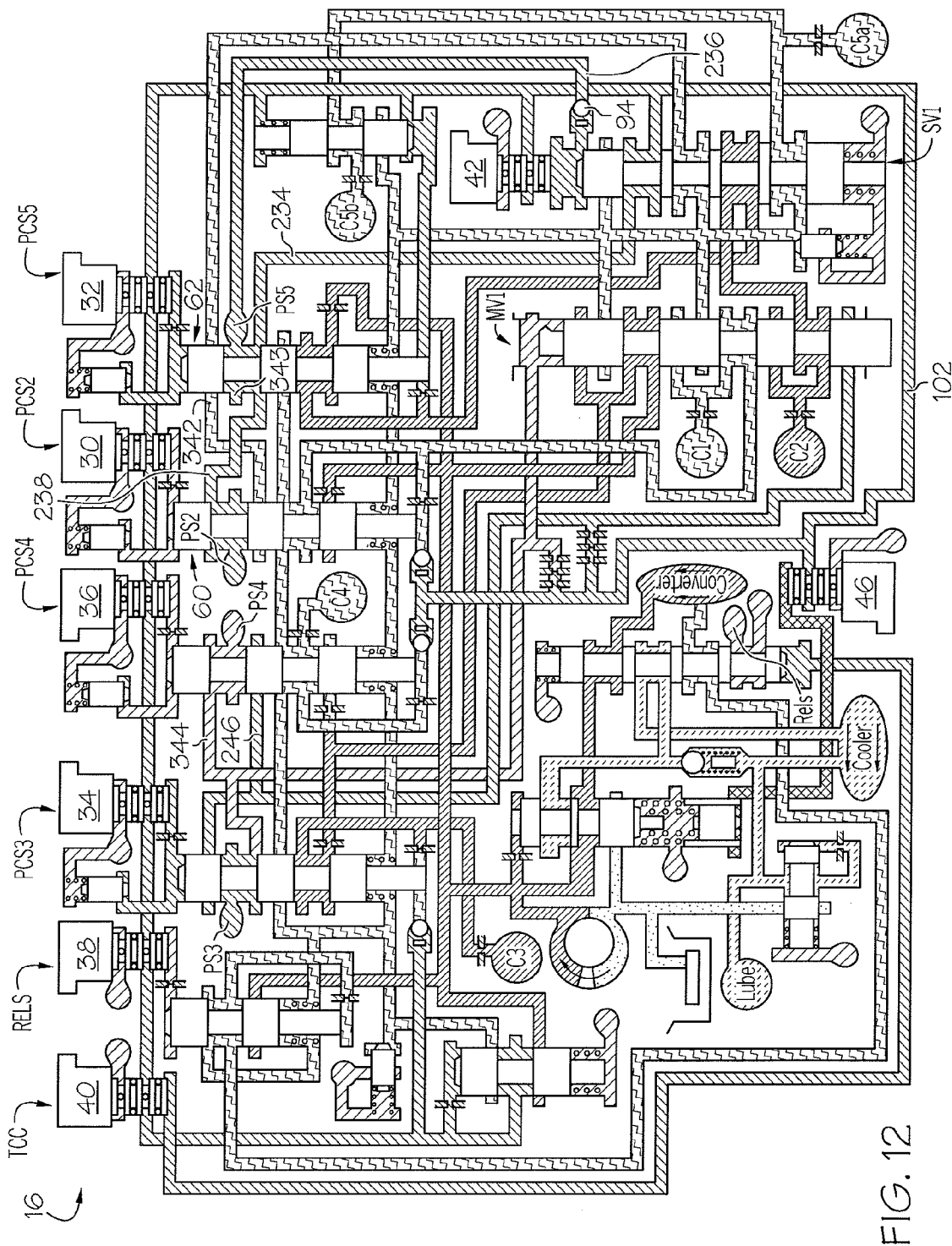

When the seventh forward ratio is requested, e.g. automatically by control 22 or by range selector 24, control 16 assumes the configuration shown in FIG. 12. In the seventh forward ratio, trim system PCS2 is deactuated, releasing shift mechanism C1. PCS3 is actuated, engaging shift mechanism C3 as described above. The positions of trim systems PCS5, PCS4, shift valve SV1 and manual valve MV1 remain the same as in FIG. 11.

In the seventh forward ratio, pressure switches PS2 and PS5 detect control pressure. Note that in FIG. 2, pressure switch PS2 detects control pressure via valve to valve passage 342, while in FIG. 12, PS2 detects control pressure via valve to valve passage 238. Thus, according to the illustrated embodiment, pressure switch PS2 can be activated as a result of different inter-valve passage arrangements.

In FIG. 12, valve to valve passage 238 connects pressure switch PS2 to fluid chamber 343 of valve 62, as a result of the relative positioning of valves 60 and 62 (the upward translation of land 254, in particular). Fluid chamber 343 is in fluid communication with pressure switch PS5 and also with passage 234, which is in fluid communication with control passage 102 via shift valve SV1.

Eighth Forward Ratio

Figure 13:
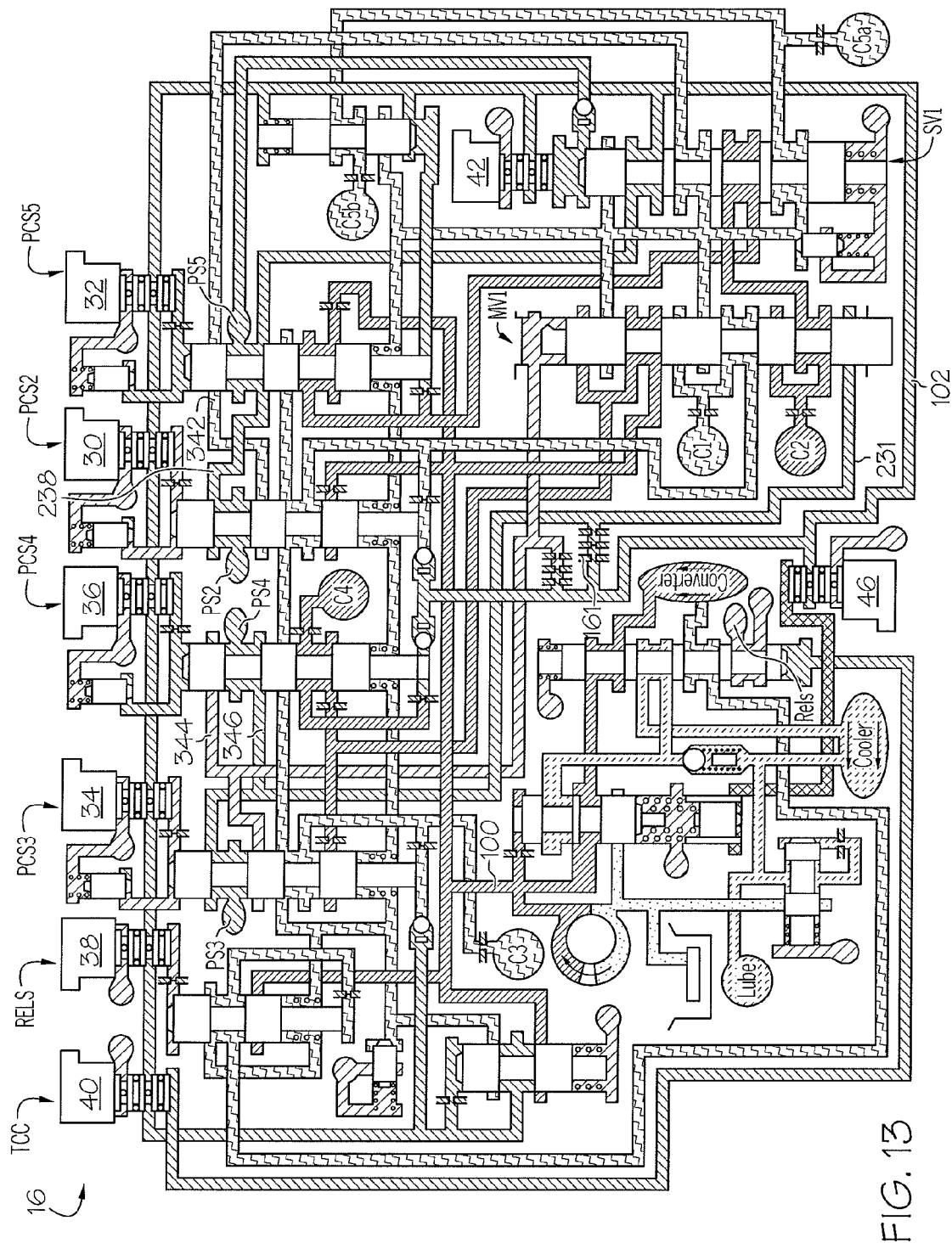

When the eighth forward ratio is requested, e.g. automatically by control 22 or by range selector 24, control 16 assumes the configuration shown in FIG. 13. In the eighth forward ratio, trim system PCS3 is deactuated, releasing shift mechanism C3. PCS4 is actuated, activating pressure switch PS4 and engaging shift mechanism C4 as described above. The positions of trim systems PCS2, PCS5, shift valve SV1 and manual valve MV1 remain the same as in FIG. 12. In the eighth forward ratio, pressure switches PS2, PS3, PS4 and PS5 detect control pressure. Whereas in FIG. 12, inter-valve passage 344 connects PS3 and PS4 to exhaust; in FIG. 13, inter-valve passage 346 connects PS3 and PS4 to control pressure.

Failure Modes

Figure 14:
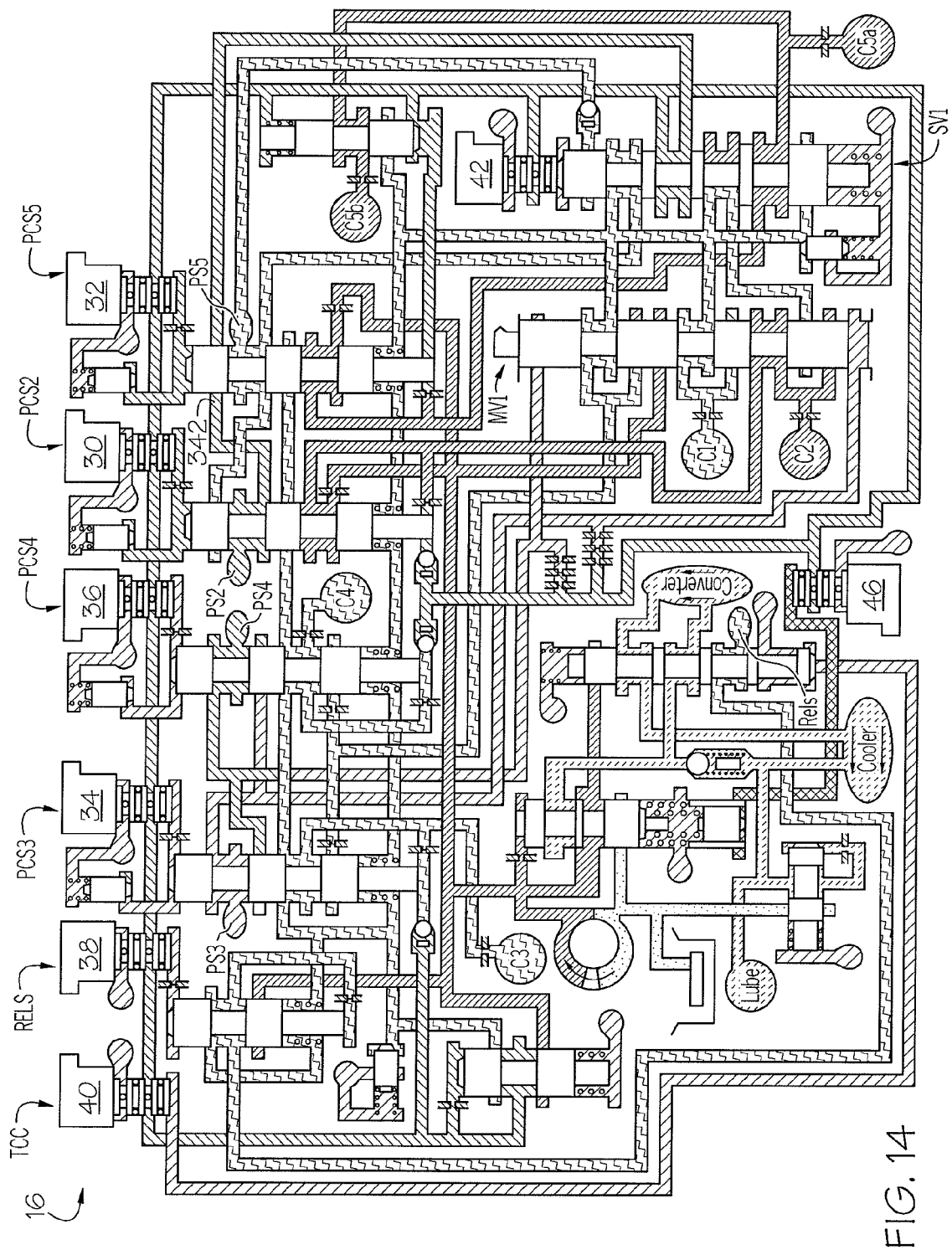
FIG. 14 is a schematic diagram of the embodiment of FIG. 2, showing a fluid passage arrangement and fluid pressure configuration for a reverse mode of operation of the motor vehicle when no electrical power is provided to the control system.
Figure 15:
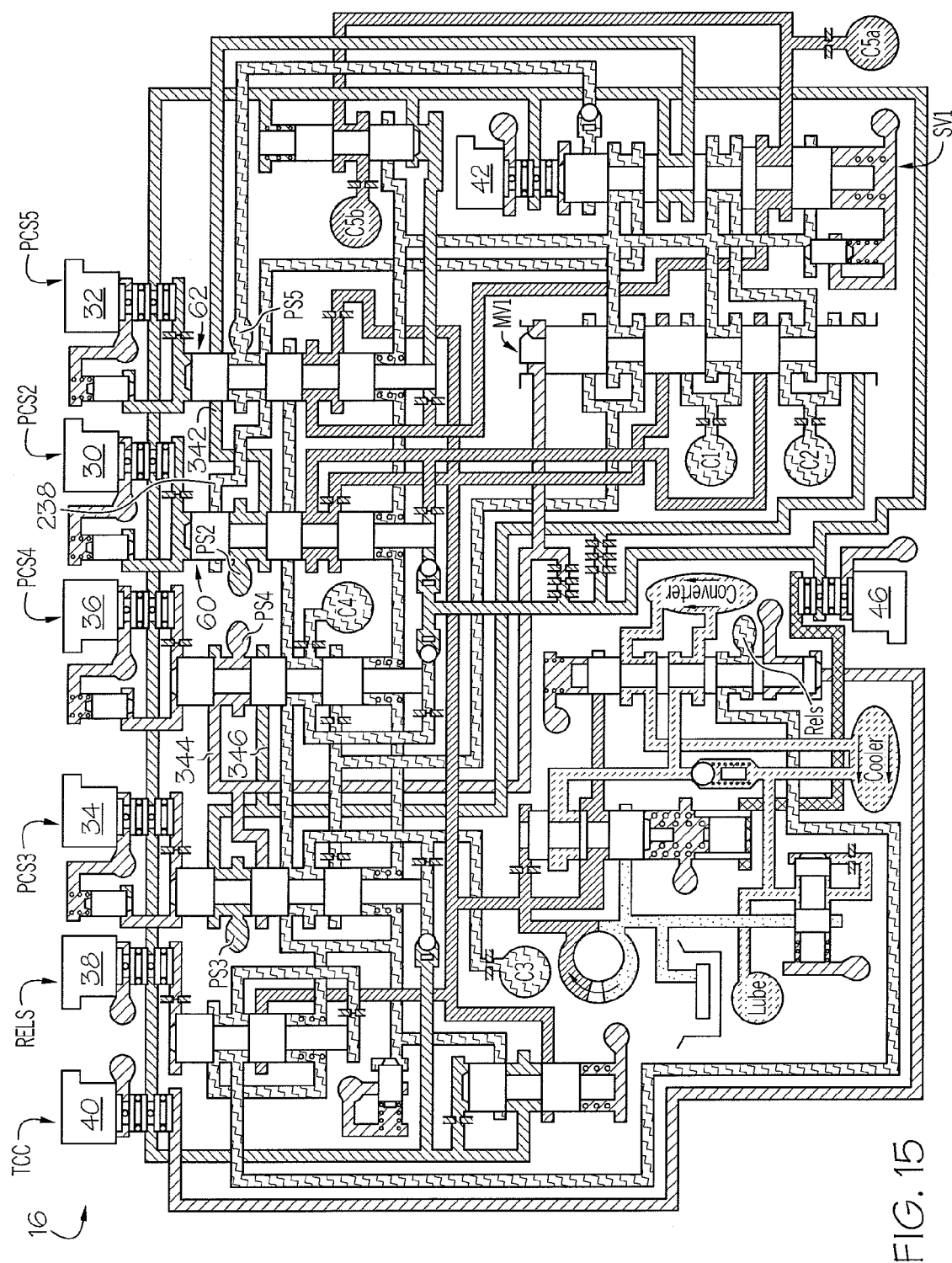
FIG. 15 is a schematic diagram of the embodiment of FIG. 2, showing a fluid passage arrangement and fluid pressure configuration for a neutral mode of operation of the motor vehicle when no electrical power is provided to the control system.
Figure 16:
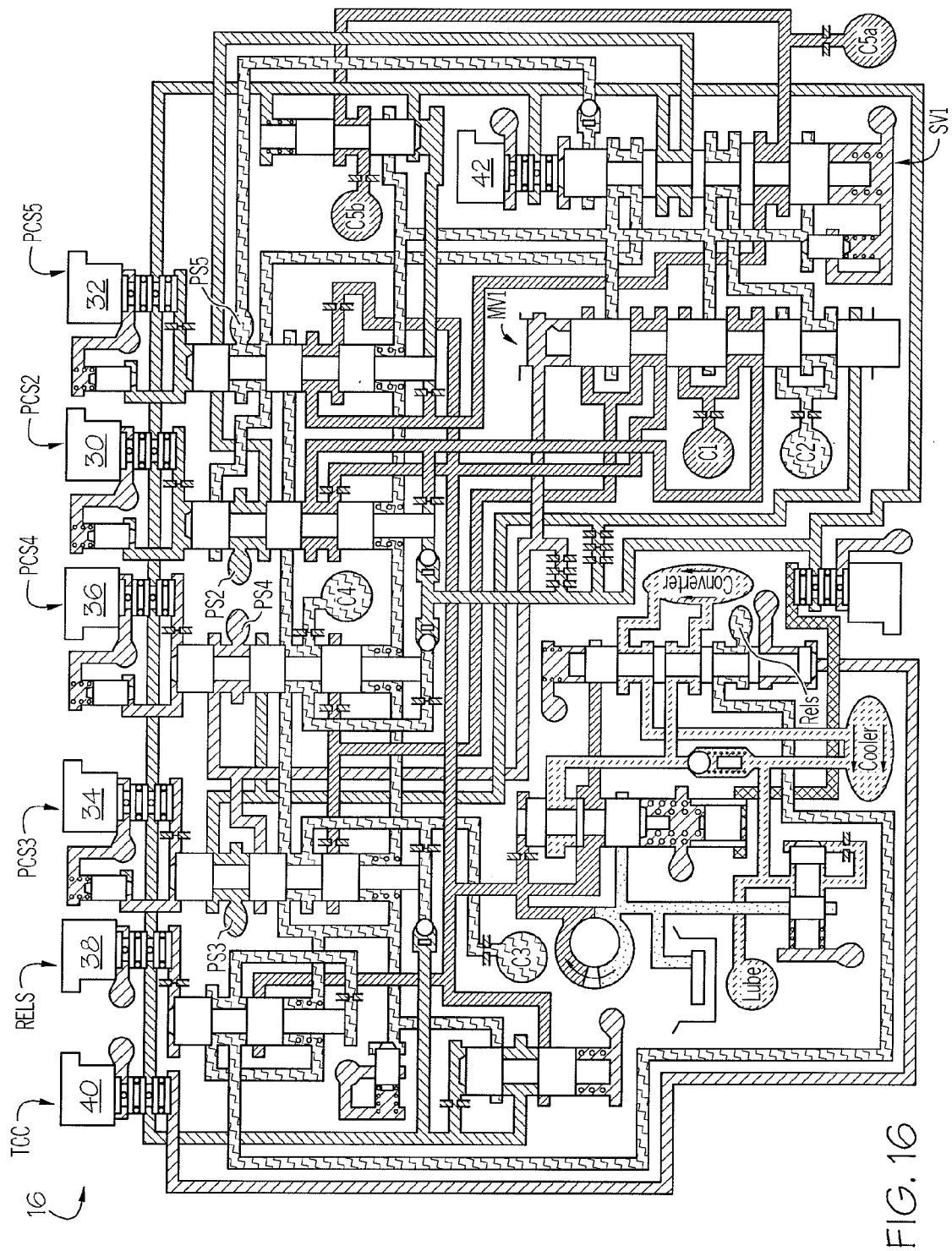
FIG. 16 is a schematic diagram of the embodiment of FIG. 2, showing a fluid passage arrangement and fluid pressure configuration for a third forward ratio of the motor vehicle when no electrical power is provided to the control system.
Figure 17:
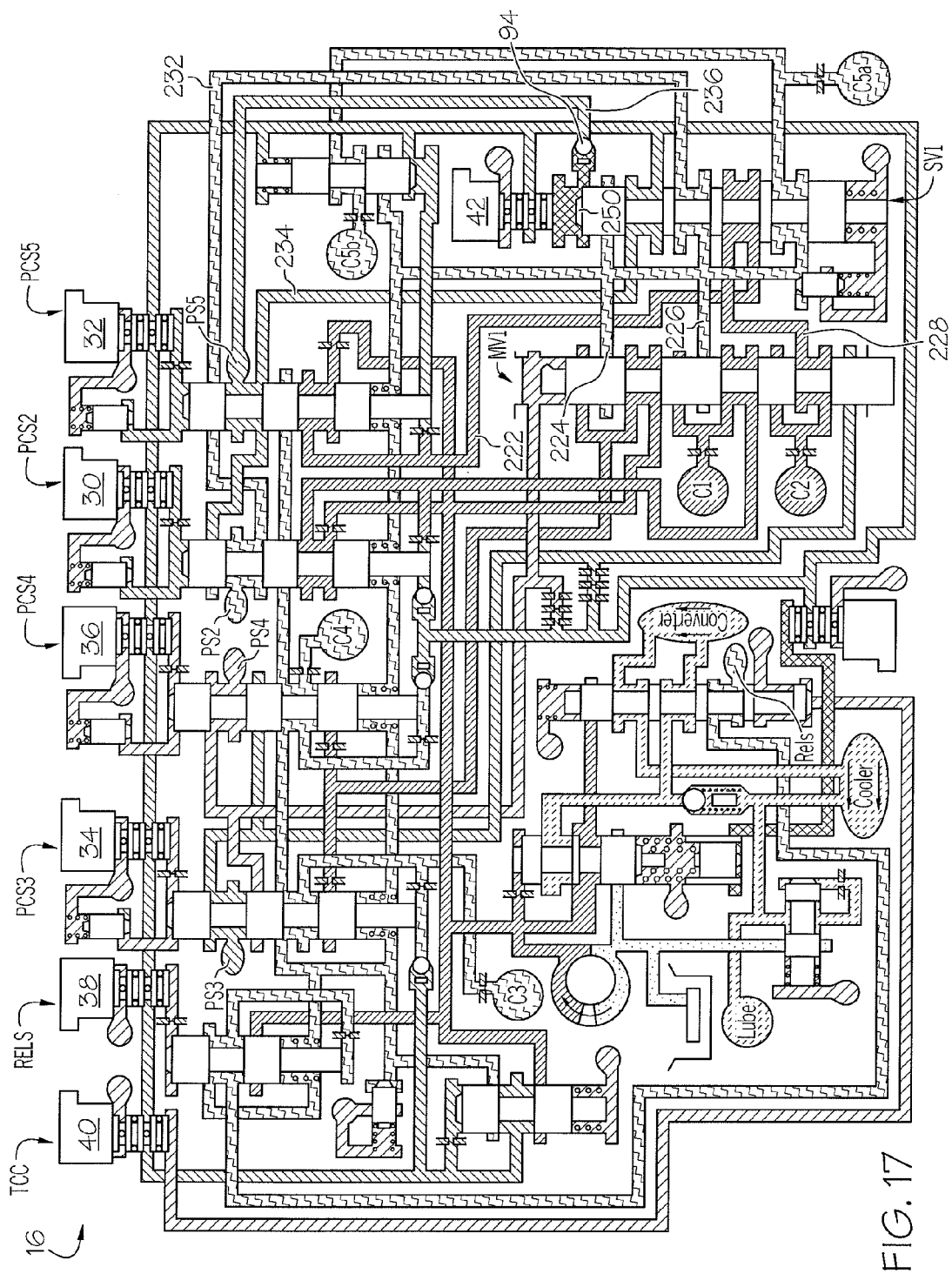
FIG. 17 is a schematic diagram of the embodiment of FIG. 2, showing a fluid passage arrangement and fluid pressure configuration for a sixth forward ratio of the motor vehicle when no electrical power is provided to the control system.
Figure 18:
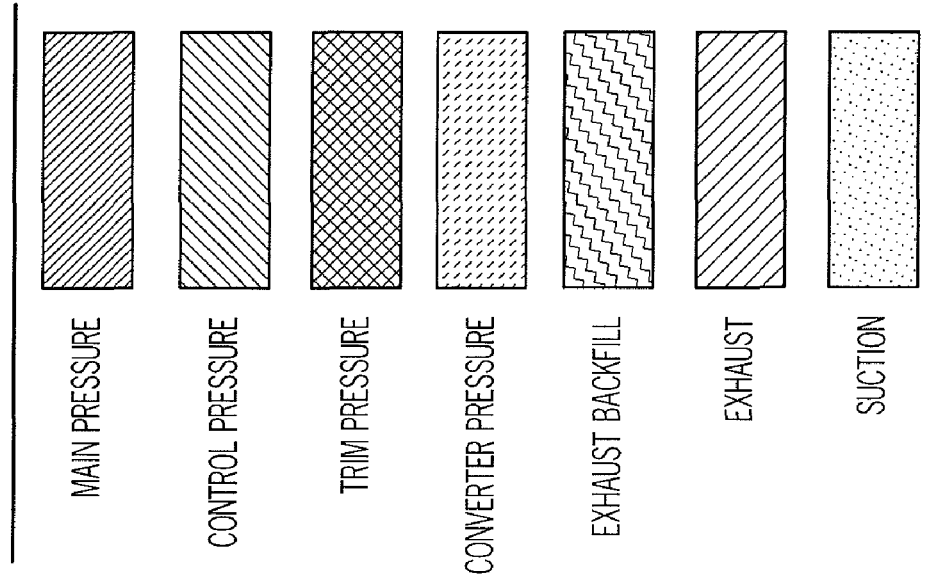
FIG. 18 is a legend indicative of fluid pressures shown in FIGS. 2-17.

FIGS. 14-17 illustrate configurations of control 16 in four different failure modes. FIG. 14 illustrates the configuration of control 16 when the vehicle is in reverse at the time of power failure. In this situation, the transmission maintains the reverse mode. FIG. 15 illustrates the configuration of control 16 when the vehicle is in neutral at the time of power failure. In this situation, the transmission maintains the neutral mode after the failure. FIG. 16 illustrates the configuration of control 16 when the vehicle is in one of the first, second, third or fourth forward ratios at the time of power failure. In any of these situations, the transmission assumes the third forward ratio after the power failure. FIG. 17 illustrates the configuration of control 16 when the vehicle is in one of the fifth, sixth, seventh or eighth forward ratios at the time of power failure. In any of these situations, the transmission assumes the sixth forward ratio after the power failure. In this way, the arrangement of control 16, including the particular configuration of fluid passages connecting to manual valve MV1, provides a number of measures, in upper and lower ratios, in the event of an electrical failure.

In the illustrated embodiment, actuators 30, 32, and 46 are normally high solenoids, while the remaining actuators 34, 36, 38, 40, 42, are normally low solenoids. As a result, in the event of a power failure, main passage 100 is able to maintain the main pressure, control passage 102 is able to maintain the control pressure and trim systems PCS2, PCS5 are actuated as described above.

As shown in FIG. 14, the activation of PCS2 in the power off/limp home mode for reverse allows the system to maintain the same arrangement of control 16 and transmission 18 as in the "normal" reverse mode shown in FIG. 2.

As compared to the "normal" neutral mode, the power off neutral mode of FIG. 15 has PCS2 actuated (e.g., due to the normally high solenoid). Actuation of PCS2 causes pressure switch PS2 to detect control pressure due to movement of land 256, which opens passage 342 to connect with PS2. Note that PS2 is activated in FIGS. 14 and 15 via inter-valve passage 342; whereas in FIGS. 12 and 13, PS2 is activated via inter-valve passage 238.

As compared to the "normal" third forward ratio, FIG. 16 shows that the torque converter clutch 26 is disengaged in the limp home third ratio, since actuator 40 is not actuated. Pump clutch 28 remains engaged because the RELS fluid chamber 202 is not required to be pressurized to engage pump clutch 28. In the embodiment of FIG. 16, there is no other difference in the configuration of control 16 between the normal and power off modes for the third forward ratio.

The same arrangement of fluid passages between shift valve SV1 and manual valve MV1 is maintained in the limp home sixth forward ratio as in the normal sixth ratio, by check valve 94. Check valve 94 allows fluid pressure from line 236 to flow to valve head 250 in the absence of electrical input to activator 42. As compared to the "normal" sixth forward ratio, FIG. 17 also shows that the torque converter clutch 26 is disengaged in the limp home sixth ratio, since actuator 40 is not actuated. Pump clutch 28 remains engaged because the RELS fluid chamber 202 is not required to be pressurized to engage pump clutch 28. Table 2 shows the status of components of control 16 during single and double range shifts, respectively. Table 2 also indicates the applied shift mechanisms and the status of the torque converter clutch 26 during single range shifts. The asterisk is used to denote that what is shown is a typical configuration; however, the torque converter clutch can be applied at any time.

TABLE 2

SINGLE RANGE SHIFTS

| Range Shift | Shift Mechanism(s) Applied | Trim System(s) Actuated | Shift Valve Actuated? | Trimming Trim System(s) | Torque Converter Clutch Status* |
|---|---|---|---|---|---|
| Neutral↔Reverse | C5 | PCS5 | No | PCS2 | Released |
| Neutral↔$1^{st}$ or $2^{nd}$-$1^{st}$ | C5 | PCS5 | No | PCS3 | Released |
| Neutral↔$2^{nd}$ or $1^{st}$-$2^{nd}$ or $3^{rd}$-$2^{nd}$ | C5 | PCS5 | No | PCS3, PSC4 | Released |
| $2^{nd}$-$3^{rd}$ or $4^{th}$-$3^{rd}$ | C5 | PCS5 | No | PCS2, PCS4 | Released |
| $3^{rd}$-$4^{th}$ or $5^{th}$-$4^{th}$ | C1 | PCS2 | No | PCS4, PS5 | Released |
| $4^{th}$-$5^{th}$ or $6^{th}$-$5^{th}$ | C1 | PCS2 | Yes | PCS3, PCS4 | Applied |
| $5^{th}$-$6^{th}$ or $7^{th}$-$6^{th}$ | C1 | PCS2 | Yes | PCS3, PCS5 | Applied |
| $6^{th}$-$7^{th}$ or $8^{th}$-$7^{th}$ | C2 | PCS5 | Yes | PCS2, PCS3 | Applied |
| $7^{th}$-$8^{th}$ | C2 | PCS5 | Yes | PCS3, PCS4 | Applied |

Control 16 accomplishes single range shifts by selectively actuating and deactuating the appropriate trim systems and pressure switches, pursuant to Table 2 and in a similar manner as described above. For example, during a shift from third forward ratio to fourth forward ratio, PCS5 is trimmed to release shift mechanism C5 and PCS2 is activated to apply shift mechanism C1. During a shift from second forward ratio to third forward ratio, PCS4 is trimmed to release shift mechanism C4 and PCS5 is actuated to apply shift mechanism C5. In addition, the TCC subsystem is actuated to engage the torque converter clutch. In the illustrated embodiment, the other single range shifts operate in a like manner according to the values listed in Table 2.

Because of the multiplexed configuration of the trim systems, only the PCS2 and PCS5 trim systems are implicated in any of the single range shifts to engage shift mechanisms C1, C2, and C5, as shown by Table 2.

Table 3 shows the status of components of control 16 during double range shifts, or skip shifts. Table 3 also indicates the applied shift mechanisms and the status of the torque converter clutch during the skip shifts. The asterisk is used to denote that what is shown is a typical configuration; however, the torque converter clutch can be applied at any time.

TABLE 3

DOUBLE RANGE (SKIP) SHIFTS

| Range Shift | Applied Shift Mechanism | Actuated Trim System | Shift Valve Actuated? | Trimming Trim System(s) | Torque Converter Clutch Status* |
|---|---|---|---|---|---|
| Reverse↔$1^{st}$ | C5 | PCS5 | No | PCS2, PCS3 | Released |
| Reverse↔$2^{nd}$ | C5 | PCS5 | No | PCS2, PCS4 | Released |
| $1^{st}$↔$3^{rd}$ | C5 | PCS5 | No | PCS2, PCS3 | Released |
| $2^{nd}$↔$4^{th}$ | C4 | PCS4 | No | PCS2, PCS5 | Released |
| $3^{rd}$↔$5^{th}$ | C1 | PCS2 | No | PCS3, PCS5 | Released |
| $4^{th}$↔$6^{th}$ | C1 | PCS2 | Yes | PCS4, PCS5 | Applied |
| $5^{th}$↔$7^{th}$ | C3 | PCS3 | Yes | PCS2, PCS5 | Applied |
| $6^{th}$↔$8^{th}$ | C2 | PCS5 | Yes | PCS2, PCS4 | Applied |

Control 16 accomplishes double range shifts or skip shifts by selectively actuating and deactuating the appropriate trim systems and pressure switches, pursuant to Table 3 and in a similar manner as described above. For example, because of the multiplexed arrangement of the trim systems, trim system PCS5 is implicated in the skip shifts from reverse to first, reverse to second, and first to third; and trim system PCS2 is implicated in the skip shifts from third to fifth and fourth to sixth forward ratio.

Other charts showing additional details of the single and double range shifts are provided in Long et al., U.S. Provisional Patent Application Ser. No. 61/045,141, filed Apr. 15, 2008, which is incorporated herein by this reference.

As described above, one or more of pressure switches PS2, PS3, PS4, and PS5 are multiplexed to provide valve diagnostics via a single pressure switch manifold or PSM. While each pressure switch is operably coupled to a trim system to detect the position of its associated trim valve, certain of the pressure switches are multiplexed to detect the position of shift valve SV1 and manual valve MV1. In the illustrated embodiment, pressure switches PS2, PS3, PS4 and PS5 are used to detect the position of trim valves 60, 64, 66, 62, respectively. Also, pressure switches PS3 and PS4 are used to detect when manual valve MV1 is in the reverse position (FIG. 2), and pressure switches PS2 and PS5 are used to detect the position of shift valve SV1. In this way, four pressure switches are multiplexed to detect the positions of six valves.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A manual valve control for a vehicle transmission having more than six forward speeds, the control comprising
    a plurality of electro-hydraulic trim valve systems configured to receive electrical signals and selectively communicate pressurized fluid to a number of transmission shift mechanisms, wherein the number of transmission shift mechanisms is greater than the number of electro-hydraulic trim valve systems,
    a shift valve in selective fluid communication with at least one of the trim valve systems and with at least one of the transmission shift mechanisms, a manual valve having a plurality of manually selectable positions, and first, second, third and fourth trim valves and a plurality of passages configured to selectively fluidly couple the first, second, third, third and fourth trim valves, the shift valve, and the manual valve to first, second, third, fourth and fifth transmission shift mechanisms, wherein the first and second trim valves, the shift valve and the manual valve control the first, second and third transmission shift mechanisms, and the third and fourth trim valves control the fourth and fifth transmission shift mechanisms.

2. The control of claim 1, comprising an electronic control and first, second, third, fourth, and fifth actuators actuatable by the electronic control, wherein the first, second, third and fourth actuators selectively provide output pressure to the first, second, third and fourth trim valves, respectively, and the fifth actuator selectively provides output pressure to the shift valve.

3. The control of claim 2, wherein the first and second actuators are normally high solenoids.

4. The control of claim 3, wherein the fifth actuator is a normally low, on/off solenoid.

5. The control of claim 2, comprising a sixth actuator actuatable to provide output pressure to a torque converter flow valve to selectively control application of a torque converter clutch.

6. The control of claim 5, comprising a reduced engine load at stop subsystem operably coupled to the torque converter flow valve.

7. The control of claim 6, wherein the reduced engine load at stop subsystem selectively disengages a torque converter pump clutch from a drive unit of the vehicle.

8. A manual valve control for a vehicle transmission having more than six forward speeds, the control comprising a plurality of electro-hydraulic trim valve systems configured to receive electrical signals and selectively communicate pressurized fluid to a number of transmission shift mechanisms, wherein the number of transmission shift mechanisms is greater than the number of electro-hydraulic trim valve systems, a shift valve in selective fluid communication with at least one of the trim valve systems and with at least one of the transmission shift mechanisms, a manual valve having a plurality of manually selectable positions, and a boost valve in fluid communication with at least one trim valve system and the shift valve.

9. A manual valve control for an automatic transmission of a vehicle, comprising at least one trim valve system configured to selectively distribute fluid pressure to at least one transmission shift mechanism, a shift valve operable to selectively distribute fluid pressure to a first transmission shift mechanism, a manual valve operable to selectively distribute fluid pressure to second and third transmission shift mechanisms, an actuator configured to selectively receive electrical signals from a controller and selectively cause fluid pressure to be applied to the shift valve, and a plurality of passages selectively fluidly coupling the manual valve and the shift valve, at least one of the passages being configured to selectively communicate main pressure between the shift valve and the manual valve.

10. The control of claim 9, wherein the transmission comprises reverse, neutral, and first through eighth forward ranges, and the passages are configured such that in the event of a power failure, the neutral range maintains the neutral range, the reverse range maintains the reverse range, the first, second, third and fourth forward ranges fail to the third forward range, and the fifth, sixth, seventh and eighth forward ranges fail to the sixth forward range.

11. The control of claim 9, comprising a valve-to-valve passage selectively fluidly coupling the shift valve to a trim valve system and a check valve disposed in the valve-to-valve passage to selectively communicate fluid pressure to the shift valve.

12. The control of claim 9, wherein the transmission comprises a reverse range, a neutral range, and a plurality of forward ranges, the control comprises at least two trim valve systems, and the passages selectively fluidly coupling the shift valve and the manual valve to each other are configured such that when the vehicle is in the neutral range, only one trim valve system is activated.

13. The control of claim 9, wherein the transmission comprises a reverse range, a neutral range, and first through eighth forward ranges, and the passages selectively fluidly coupling the shift valve and the manual valve to each other are configured such that the shift valve distributes fluid pressure to the first transmission shift mechanism when the vehicle is in the first, second, or third forward range, the manual valve distributes fluid pressure to the second transmission shift mechanism when the vehicle is in the fourth, fifth, or sixth forward range, and the manual valve distributes fluid pressure to the third transmission shift mechanism when the vehicle is in the sixth, seventh or eighth forward range.

14. A manual valve control for an automatic transmission of a vehicle, comprising a plurality of trim valves, a shift valve in selective fluid communication with at least one of the trim valves and with a plurality of transmission shift mechanisms, and a plurality of pressure switches operably coupled to the trim valves and the shift valve to detect the position of each of the trim valves and the shift valve, wherein the number of pressure switches is less than the sum of the number of trim valves plus the shift valve.

15. The control of claim 14, comprising first, second, third and fourth trim valves, and first, second, third and fourth pressure switches in fluid communication with the first, second, third and fourth trim valves, respectively, wherein at least one of the pressure switches detects the position of a trim valve and is configured to detect the position of the shift valve.

16. The control of claim 15, wherein the pressure switches are operable to detect changes in the positions of the trim valves and the shift valve corresponding to single range shifts, double range shifts, and reverse directions.

17. The control of claim 15, comprising a valve to valve passage selectively fluidly coupling two of the pressure switches to a pressurized fluid passage.

18. The control of claim 14, comprising a manual valve having a plurality of manually selectable positions, wherein two of the pressure switches are configured to detect a position of the manual valve.

* * * * *